US012155134B2

(12) United States Patent
Avser et al.

(10) Patent No.: US 12,155,134 B2
(45) Date of Patent: Nov. 26, 2024

(54) ELECTRONIC DEVICES HAVING DIELECTRIC RESONATOR ANTENNAS WITH PARASITIC PATCHES

(71) Applicant: Apple Inc., Cupertino, CA (US)

(72) Inventors: Bilgehan Avser, Mountain View, CA (US); Harish Rajagopalan, San Jose, CA (US); Jennifer M. Edwards, San Francisco, CA (US); Simone Paulotto, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 469 days.

(21) Appl. No.: 16/851,848

(22) Filed: Apr. 17, 2020

(65) Prior Publication Data

US 2021/0328351 A1 Oct. 21, 2021

(51) Int. Cl.
*H01Q 1/40* (2006.01)
*H01Q 5/35* (2015.01)
(Continued)

(52) U.S. Cl.
CPC ............. *H01Q 9/0485* (2013.01); *H01Q 5/35* (2015.01); *H01Q 5/385* (2015.01)

(58) Field of Classification Search
CPC ........ H01Q 1/243; H01Q 9/0485; H01Q 1/38; H01Q 1/48; H01Q 21/28; H01Q 3/24; H01Q 21/0006; H01Q 21/24; H01Q 21/29; H01Q 21/30; H01Q 3/26; H01Q 9/0421; H01Q 13/06; H01Q 13/10; H01Q 13/103; H01Q 21/065; H01Q 9/04; H01Q 5/35;
(Continued)

(56) References Cited

U.S. PATENT DOCUMENTS 5,453,754 A * 9/1995 Fray ........................ H01Q 19/09 343/873
5,952,972 A * 9/1999 Ittipiboon ............ H01Q 9/0485 343/873
(Continued)

FOREIGN PATENT DOCUMENTS

CN 101958454 A 1/2011
CN 106356616 A 1/2017
(Continued)

OTHER PUBLICATIONS

Abedian et al., "Compact Ultrawideband MIMO Dielectric Resonator Antennas with WLAN Band Rejection," IET Microwaves, Antennas & Propagation, vol. 11, Issue: 11, Sep. 21, 2017, pp. 1524-1529.
(Continued)

*Primary Examiner* — Linh V Nguyen
(74) *Attorney, Agent, or Firm* — Treyz Law Group, P.C.; Michael H. Lyons; Tianyi He

(57) ABSTRACT

An electronic device may be provided with a phased antenna array and a display cover layer. The phased antenna array may include a probe-fed dielectric resonator antenna that radiates through the cover layer. The antenna may include a dielectric resonating element that is excited by one or two feed probes. One or more floating parasitic elements and/or grounded parasitic elements may be patterned onto the dielectric resonating element. The parasitic elements may create boundary conditions on the dielectric resonating element that serve to isolate the antenna from cross polarization interference.

20 Claims, 17 Drawing Sheets

(51) Int. Cl.
*H01Q 5/385* (2015.01)
*H01Q 9/04* (2006.01)

(58) Field of Classification Search
CPC ........ H01Q 5/385; H01Q 1/50; H01Q 9/0492; H01Q 13/18; H01Q 25/02; H01Q 5/342
USPC .......................................... 341/702, 700 MS
See application file for complete search history.

(56) References Cited

U.S. PATENT DOCUMENTS

| | | | | |
|---|---|---|---|---|
| 6,317,094 | B1 * | 11/2001 | Wu | H01Q 21/0087 343/770 |
| 6,531,991 | B2 | 3/2003 | Adachi et al. | |
| 6,768,454 | B2 | 7/2004 | Kingsley et al. | |
| 6,801,164 | B2 | 10/2004 | Bit-Babik et al. | |
| 6,995,715 | B2 | 2/2006 | Ying et al. | |
| 7,161,535 | B2 * | 1/2007 | Palmer | H01Q 9/0485 343/700 MS |
| 7,405,697 | B2 | 7/2008 | Ying | |
| 7,605,763 | B2 | 10/2009 | Finn et al. | |
| 7,710,325 | B2 | 5/2010 | Cheng | |
| 8,493,272 | B2 | 7/2013 | Ollikainen et al. | |
| 8,854,269 | B2 | 10/2014 | Bortoin et al. | |
| 8,866,692 | B2 * | 10/2014 | Vazquez | H01Q 1/48 343/702 |
| 9,074,070 | B2 | 7/2015 | Yung et al. | |
| 9,225,070 | B1 | 12/2015 | Zeweri et al. | |
| 9,667,290 | B2 | 5/2017 | Ouyang et al. | |
| 9,685,700 | B2 | 6/2017 | Komulainen et al. | |
| 9,831,562 | B2 | 11/2017 | Caratelli et al. | |
| 9,899,725 | B2 | 2/2018 | Soliman et al. | |
| 10,027,006 | B2 | 7/2018 | Cheng et al. | |
| 10,181,632 | B2 | 1/2019 | Cruickshank et al. | |
| 2002/0180646 | A1 * | 12/2002 | Kivekas | H01Q 9/0485 343/702 |
| 2003/0043075 | A1 | 3/2003 | Bit-Babik et al. | |
| 2005/0179598 | A1 | 8/2005 | Legay et al. | |
| 2010/0103052 | A1 * | 4/2010 | Ying | H01Q 1/38 343/702 |
| 2011/0012794 | A1 | 1/2011 | Schlub et al. | |
| 2012/0212386 | A1 | 8/2012 | Massie et al. | |
| 2013/0113674 | A1 | 5/2013 | Ryu | |
| 2014/0085163 | A1 | 3/2014 | Gregg | |
| 2014/0113828 | A1 | 4/2014 | Gilbert et al. | |
| 2014/0327596 | A1 * | 11/2014 | Darooka | H01Q 5/22 343/904 |
| 2014/0327597 | A1 * | 11/2014 | Rashidian | H01Q 1/50 343/905 |
| 2015/0116159 | A1 | 4/2015 | Chen et al. | |
| 2016/0204509 | A1 | 7/2016 | Zhai et al. | |
| 2016/0322708 | A1 * | 11/2016 | Tayfeh Aligodarz | H01Q 21/0087 |
| 2017/0125908 | A1 * | 5/2017 | Pance | H01Q 21/30 |
| 2017/0201011 | A1 | 7/2017 | Khripkov et al. | |
| 2017/0271772 | A1 * | 9/2017 | Miraftab | H01Q 9/0485 |
| 2018/0026341 | A1 * | 1/2018 | Mow | H04B 10/90 343/702 |
| 2018/0342801 | A1 | 11/2018 | Sharawi et al. | |
| 2019/0013584 | A1 | 1/2019 | Ryu et al. | |
| 2019/0027802 | A1 * | 1/2019 | Noori | H01Q 19/005 |
| 2019/0267718 | A1 | 8/2019 | Rajagopalan et al. | |
| 2019/0379134 | A1 | 12/2019 | Paulotto et al. | |
| 2020/0044326 | A1 * | 2/2020 | Olfert | H01Q 21/0012 |
| 2020/0083579 | A1 | 3/2020 | Chun et al. | |

FOREIGN PATENT DOCUMENTS

| | | | |
|---|---|---|---|
| KR | 20150122746 | A | 11/2015 |
| WO | 2005015689 | A1 | 2/2005 |

OTHER PUBLICATIONS

U.S. Appl. No. 16/289,433, filed Feb. 28, 2019.
U.S. Appl. No. 16/289,459, filed Feb. 28, 2019.
Kumar et al., "Cross-Polarization Reduction of a Cylindrical Dielectric Resonator Antenna with Parasitic Strip Loading," IEEE, 2018 International Conference on Signal Processing and Communications (SPCOM), May 30, 2019, pp. 139-142.
Guo-Jin et al., "Research and design of ultra-wideband practical dielectric resonator antenna," Modern Electronic Technology, vol. 40, Issue: 13, Jul. 1, 2017, pp. 77-79.
Ming, "Research and Design of Broadband and Dual-Frequency Dielectric Resonant Antenna," Wanfang Academic, May 4, 2016, Chapters 3-4.
R.T. Long et al., Use of Parasitic Strip to Produce Circular Polarisation and Increased Bandwidth for Cylindrical Dielectric Resonator Antenna, Electronic Letters, Mar. 29, 2001, vol. 37, No. 7.

* cited by examiner

ELECTRONIC DEVICES HAVING DIELECTRIC RESONATOR ANTENNAS WITH PARASITIC PATCHES

BACKGROUND

This relates generally to electronic devices and, more particularly, to electronic devices with wireless circuitry.

Electronic devices often include wireless circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies may support high bandwidths but may raise significant challenges. For example, radio-frequency communications in millimeter and centimeter wave communications bands can be characterized by substantial attenuation and/or distortion during signal propagation through various mediums. In addition, the presence of conductive electronic device components can make it difficult to incorporate circuitry for handling millimeter and centimeter wave communications into the electronic device. In scenarios where the antennas cover multiple polarizations, cross-polarization interference can also limit antenna performance.

It would therefore be desirable to be able to provide electronic devices with improved wireless circuitry such as wireless circuitry that supports millimeter and centimeter wave communications.

SUMMARY

An electronic device may be provided with a housing, a display, and wireless circuitry. The housing may include peripheral conductive housing structures that run around a periphery of the device. The display may include a display cover layer mounted to the peripheral conductive housing structures. The wireless circuitry may include a phased antenna array that conveys radio-frequency signals in one or more frequency bands between 10 GHz and 300 GHz. The phased antenna array may convey the radio-frequency signals through the display cover layer or other dielectric cover layers in the device.

The phased antenna array may include probe-fed dielectric resonator antennas. Each probe-fed dielectric resonator antenna may include a dielectric resonating element formed from a column of relatively high dielectric constant material that is embedded within a surrounding dielectric substrate. The dielectric resonating element may be mounted to a flexible printed circuit. The dielectric resonating element may have first, second, third, and fourth sidewalls extending from the flexible printed circuit to the display. The third sidewall may oppose the first sidewall whereas the fourth sidewall opposes the second sidewall.

A feed probe may be formed from a patch of conductive traces patterned on the first sidewall of the dielectric resonating element. In a first example, an additional feed probe may be formed from an additional patch of conductive traces patterned on the second sidewall. A first floating parasitic patch may be coupled to the third sidewall and may overlap the first feed probe. A second floating parasitic patch may be coupled to the fourth sidewall and may overlap the second feed probe. An additional set of floating parasitic patches may be formed at an opposing end of the dielectric resonating element if desired. In another example, a first grounded parasitic patch may be coupled to the second sidewall and a second grounded parasitic patch may be coupled to the fourth sidewall. The second grounded patch may overlap the first grounded patch. The parasitic patches may create boundary conditions on the dielectric resonating element for the feed probes and may serve to isolate the antenna from cross-polarization interference.

DETAILED DESCRIPTION

Figure 1:
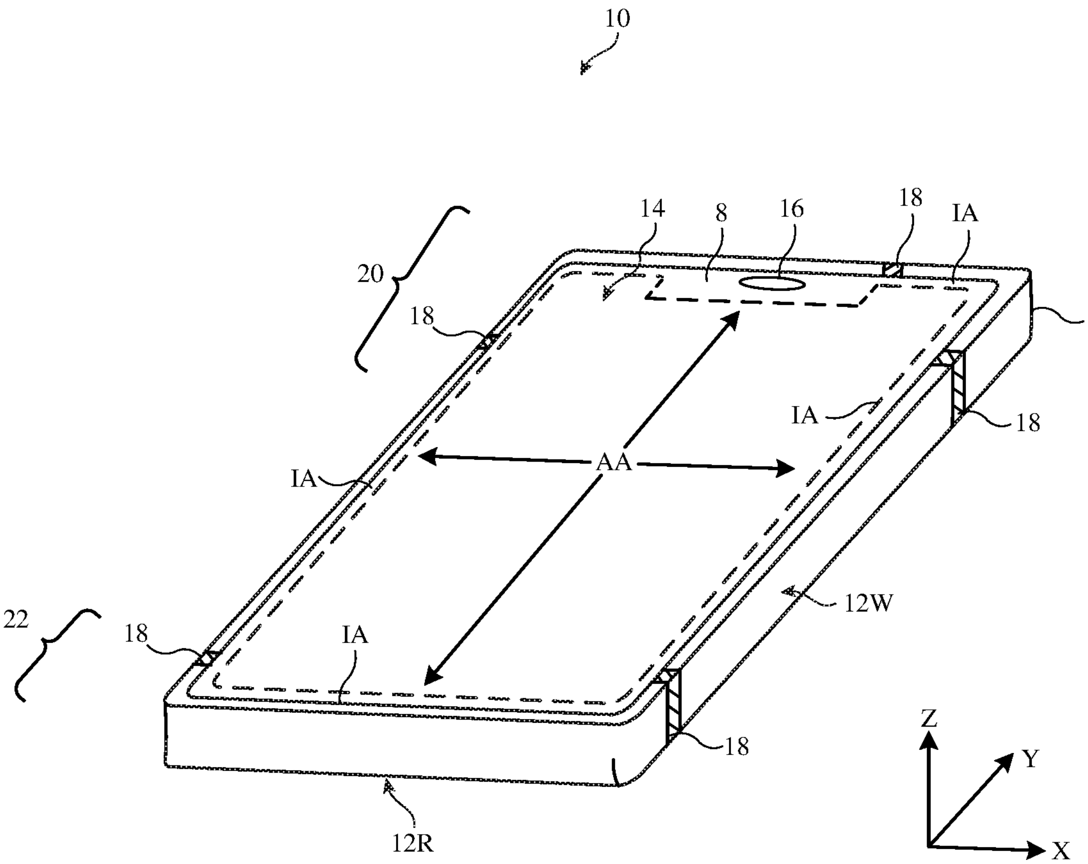
FIG. 1 is a perspective view of an illustrative electronic device in accordance with some embodiments.

An electronic device such as electronic device 10 of FIG. 1 may contain wireless circuitry. The wireless circuitry may include one or more antennas. The antennas may include phased antenna arrays that are used for performing wireless communications using millimeter and centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, device 10 may also contain antennas for handling satellite navigation system signals, cellular telephone signals, local wireless area network signals, near-field communications, light-based wireless communications, or other wireless communications.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic. Housing 12 may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 8 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 8 of inactive area IA). Notch 8 may be a substantially rectangular region that is surrounded (defined) on three sides by active area AA and on a fourth side by peripheral conductive housing structures 12W.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 8 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate) that spans the walls of housing 12 (i.e., a substantially rectangular sheet formed from one or more metal parts that is welded or otherwise connected between opposing sides of peripheral conductive structures 12W). The backplate may form an exterior rear surface of device 10 or may be covered by layers such as thin cosmetic layers, protective coatings, and/or other coatings that may include dielectric materials such as glass, ceramic, plastic, or other structures that form the exterior surfaces of device 10 and/or serve to hide the backplate from view of the user. Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20.

In general, device 10 may include any suitable number of antennas (e.g., one or more, two or more, three or more, four or more, etc.). The antennas in device 10 may be located at opposing first and second ends of an elongated device housing (e.g., ends at regions 22 and 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas (as an example). An upper antenna may, for example, be formed at the upper end of device 10 in region 20. A lower antenna may, for example, be formed at the lower end of device 10 in region 22. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
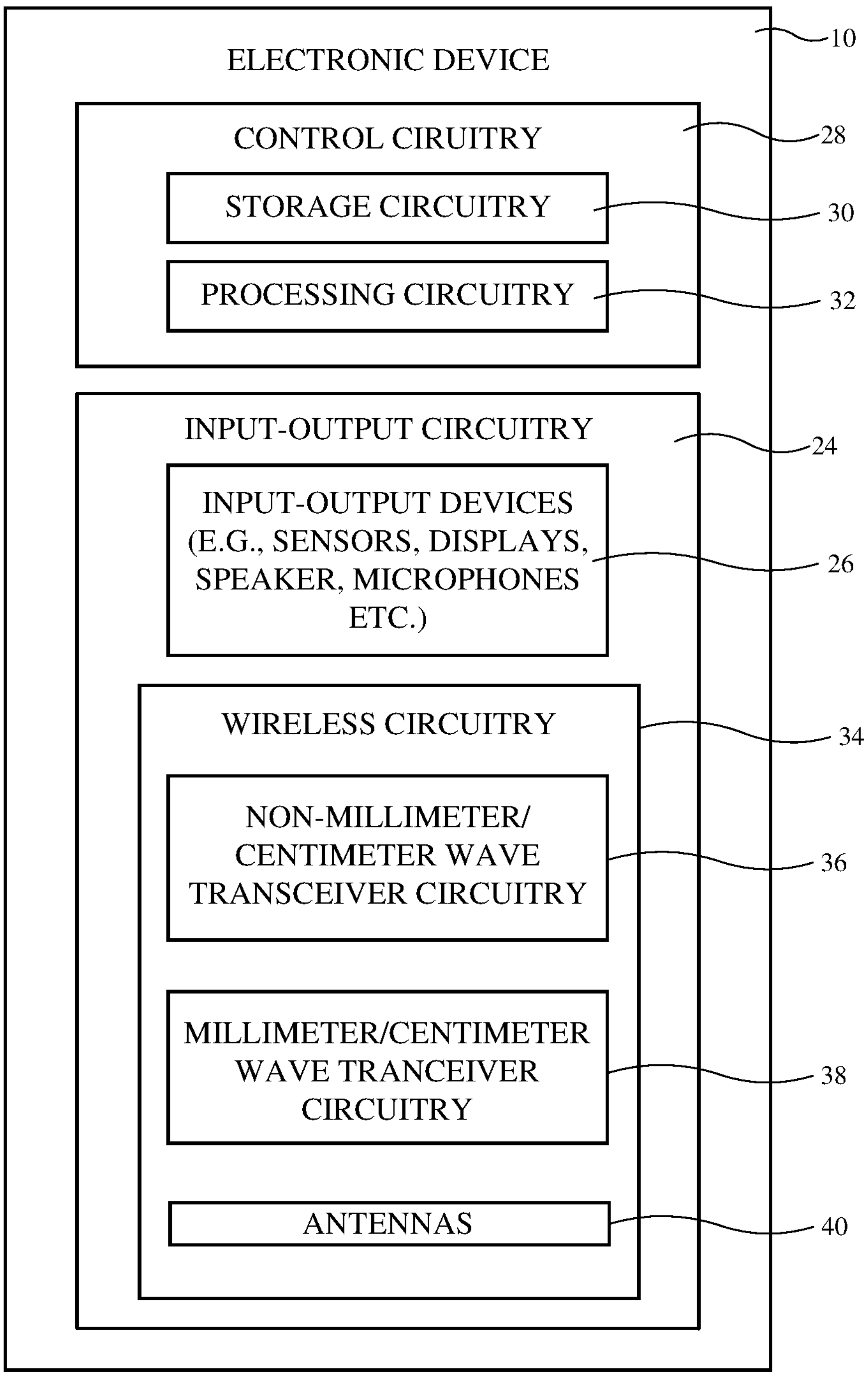
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc. Control circuitry 28 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on device 10 such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 24 may include wireless circuitry such as wireless circuitry 34 for wireles sly conveying radio-frequency signals. While control circuitry 28 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband processor circuitry or other control components that form a part of wireless circuitry 34.

Wireless circuitry 34 may include millimeter and centimeter wave transceiver circuitry such as millimeter/centimeter wave transceiver circuitry 38. Millimeter/centimeter wave transceiver circuitry 38 may support communications at frequencies between about 10 GHz and 300 GHz. For example, millimeter/centimeter wave transceiver circuitry 38 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter/centimeter wave transceiver circuitry 38 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, millimeter/centimeter wave transceiver circuitry 38 may support IEEE 802.11ad communications at 60 GHz and/or $5^{th}$ generation mobile networks or $5^{th}$ generation wireless systems (5G) communications bands between 27 GHz and 90 GHz. Millimeter/centimeter wave transceiver circuitry 38 may be formed from one or more integrated circuits (e.g., multiple integrated circuits mounted on a common printed circuit in a system-in-package device, one or more integrated circuits mounted on different substrates, etc.).

If desired, millimeter/centimeter wave transceiver circuitry 38 (sometimes referred to herein simply as transceiver circuitry 38 or millimeter/centimeter wave circuitry 38) may perform spatial ranging operations using radio-frequency signals at millimeter and/or centimeter wave signals that are transmitted and received by millimeter/centimeter wave transceiver circuitry 38. The received signals may be a version of the transmitted signals that have been reflected off of external objects and back towards device 10. Control circuitry 28 may process the transmitted and received signals to detect or estimate a range between device 10 and one or more external objects in the surroundings of device 10 (e.g., objects external to device 10 such as the body of a user or other persons, other devices, animals, furniture, walls, or other objects or obstacles in the vicinity of device 10). If desired, control circuitry 28 may also process the transmitted and received signals to identify a two or three-dimensional spatial location of the external objects relative to device 10.

Spatial ranging operations performed by millimeter/centimeter wave transceiver circuitry 38 are unidirectional. Millimeter/centimeter wave transceiver circuitry 38 may perform bidirectional communications with external wireless equipment. Bidirectional communications involve both the transmission of wireless data by millimeter/centimeter wave transceiver circuitry 38 and the reception of wireless data that has been transmitted by external wireless equipment. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 34 may include transceiver circuitry for handling communications at frequencies below 10 GHz such as non-millimeter/centimeter wave transceiver circuitry 36. Non-millimeter/centimeter wave transceiver circuitry 36 may include wireless local area network (WLAN) transceiver circuitry that handles 2.4 GHz and 5 GHz bands for Wi-Fi® (IEEE 802.11) communications, wireless personal area network (WPAN) transceiver circuitry that handles the 2.4 GHz Bluetooth® communications band, cellular telephone transceiver circuitry that handles cellular telephone communications bands from 700 to 960 MHz, 1710 to 2170 MHz, 2300 to 2700 MHz, and/or or any other desired cellular telephone communications bands between 600 MHz and 4000 MHz, GPS receiver circuitry that receives GPS signals at 1575 MHz or signals for handling other satellite positioning data (e.g., GLONASS signals at 1609 MHz), television receiver circuitry, AM/FM radio receiver circuitry, paging system transceiver circuitry, ultra-wideband (UWB) transceiver circuitry, near field communications (NFC) circuitry, etc. Non-millimeter/centimeter wave transceiver circuitry 36 and millimeter/centimeter wave transceiver circuitry 38 may each include one or more integrated circuits, power amplifier circuitry, low-noise input amplifiers, passive radio-frequency components, switching circuitry, transmission line structures, and other circuitry for handling radio-frequency signals. Non-millimeter/centimeter wave transceiver circuitry 36 may be omitted if desired.

Wireless circuitry 34 may include antennas 40. Non-millimeter/centimeter wave transceiver circuitry 36 may convey radio-frequency signals below 10 GHz using one or more antennas 40. Millimeter/centimeter wave transceiver circuitry 38 may convey radio-frequency signals above 10 GHz (e.g., at millimeter wave and/or centimeter wave frequencies) using antennas 40. In general, transceiver circuitry 36 and 38 may be configured to cover (handle) any suitable communications (frequency) bands of interest. The transceiver circuitry may convey radio-frequency signals using antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. Millimeter/centimeter wave transceiver circuitry 38 may convey radio-frequency signals over short distances that travel over a line-of-sight path. To enhance signal reception for millimeter and centimeter wave communications, phased antenna arrays and beam steering techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Different types of antennas may be used for different bands and combinations of bands. For example, one type of antenna may be used in forming a non-millimeter/centimeter wave wireless link for non-millimeter/centimeter wave transceiver circuitry 36 and another type of antenna may be used in conveying radio-frequency signals at millimeter and/or centimeter wave frequencies for millimeter/centimeter wave transceiver circuitry 38. Antennas 40 that are used to convey radio-frequency signals at millimeter and centimeter wave frequencies may be arranged in one or more phased antenna arrays.

Figure 3:
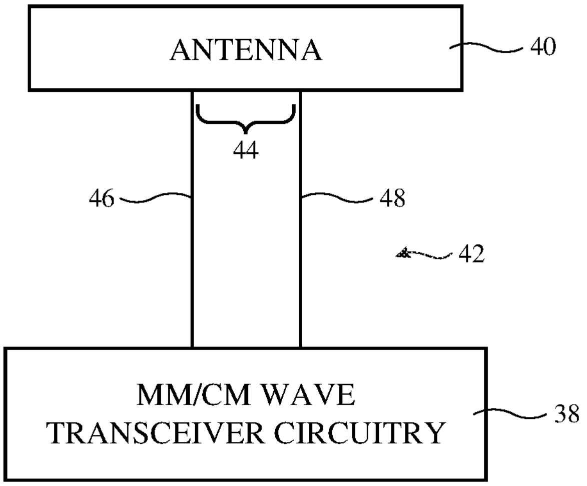
FIG. 3 is a schematic diagram of illustrative wireless circuitry in accordance with some embodiments.

A schematic diagram of an antenna 40 that may be formed in a phased antenna array for conveying radio-frequency signals at millimeter and centimeter wave frequencies is shown in FIG. 3. As shown in FIG. 3, antenna 40 may be coupled to millimeter/centimeter (MM/CM) wave transceiver circuitry 38. Millimeter/centimeter wave transceiver circuitry 38 may be coupled to antenna feed 44 of antenna 40 using a transmission line path that includes radio-frequency transmission line 42. Radio-frequency transmission line 42 may include a positive signal conductor such as signal conductor 46 and may include a ground conductor such as ground conductor 48. Ground conductor 48 may be coupled to the antenna ground for antenna 40 (e.g., over a ground antenna feed terminal of antenna feed 44 located at the antenna ground). Signal conductor 46 may be coupled to the antenna resonating element for antenna 40. For example, signal conductor 46 may be coupled to a positive antenna feed terminal of antenna feed 44 located at the antenna resonating element.

In another suitable arrangement, antenna 40 may be a probe-fed antenna that is fed using a feed probe. In this arrangement, antenna feed 44 may be implemented as a feed probe. Signal conductor 46 may be coupled to the feed probe. Radio-frequency transmission line 42 may convey radio-frequency signals to and from the feed probe. When radio-frequency signals are being transmitted over the feed probe and the antenna, the feed probe may excite the resonating element for the antenna (e.g., may excite electromagnetic resonant modes of a dielectric antenna resonating element for antenna 40). The resonating element may radiate the radio-frequency signals in response to excitation by the feed probe. Similarly, when radio-frequency signals are received by the antenna (e.g., from free space), the radio-frequency signals may excite the resonating element for the antenna (e.g., may excite electromagnetic resonant modes of the dielectric antenna resonating element for antenna 40). This may produce antenna currents on the feed probe and the corresponding radio-frequency signals may be passed to the transceiver circuitry over the radio-frequency transmission line.

Radio-frequency transmission line 42 may include a stripline transmission line (sometimes referred to herein simply as a stripline), a coaxial cable, a coaxial probe realized by metalized vias, a microstrip transmission line, an edge-coupled microstrip transmission line, an edge-coupled stripline transmission lines, a waveguide structure, combinations of these, etc. Multiple types of transmission lines may be used to form the transmission line path that couples millimeter/centimeter wave transceiver circuitry 38 to antenna feed 44. Filter circuitry, switching circuitry, impedance matching circuitry, phase shifter circuitry, amplifier circuitry, and/or other circuitry may be interposed on radio-frequency transmission line 42, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 4:
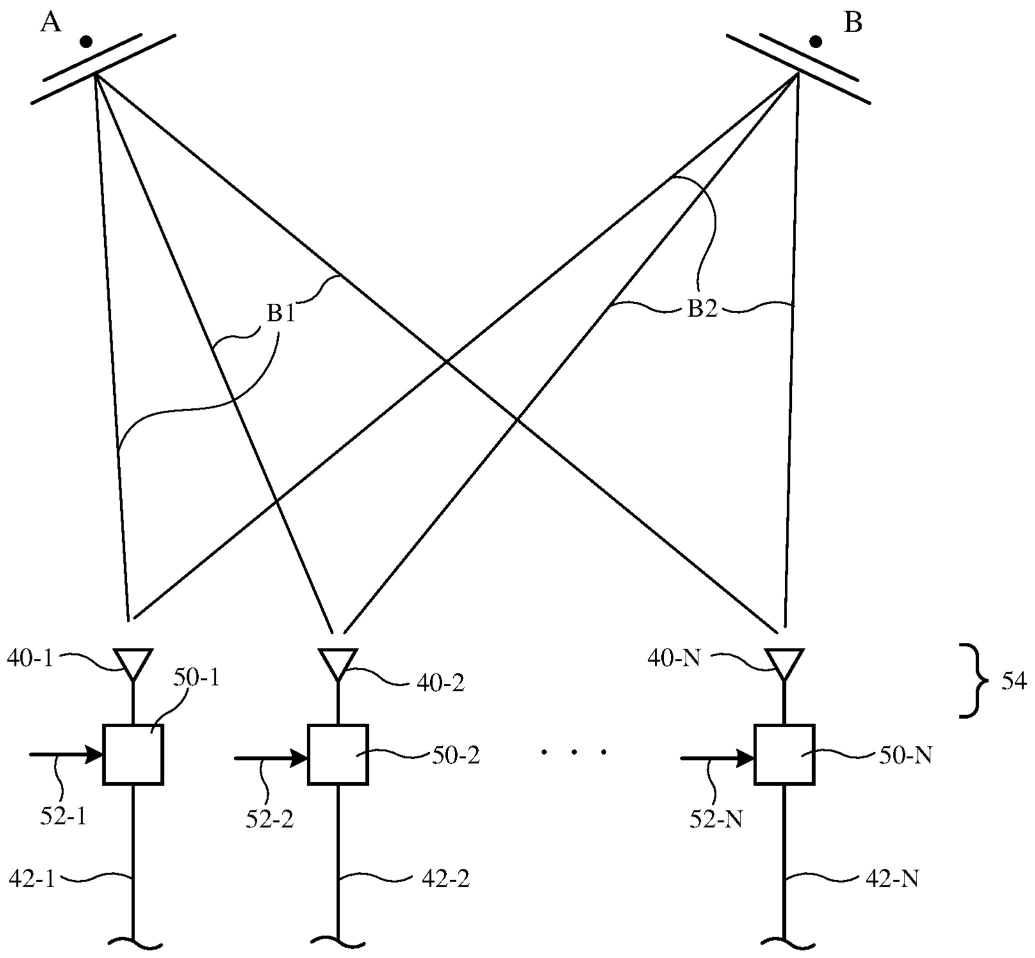
FIG. 4 is a diagram of an illustrative phased antenna array that may be adjusted using control circuitry to direct a beam of signals in accordance with some embodiments.

FIG. 4 shows how antennas 40 for handling radio-frequency signals at millimeter and centimeter wave frequencies may be formed in a phased antenna array. As shown in FIG. 4, phased antenna array 54 (sometimes referred to herein as array 54, antenna array 54, or array 54 of antennas 40) may be coupled to radio-frequency transmission lines 42. For example, a first antenna 40-1 in phased antenna array 54 may be coupled to a first radio-frequency transmission line 42-1, a second antenna 40-2 in phased antenna array 54 may be coupled to a second radio-frequency transmission line 42-2, an Nth antenna 40-N in phased antenna array 54 may be coupled to an Nth radio-frequency transmission line 42-N, etc. While antennas 40 are described herein as forming a phased antenna array, the antennas 40 in phased antenna array 54 may sometimes also be referred to as collectively forming a single phased array antenna.

Antennas 40 in phased antenna array 54 may be arranged in any desired number of rows and columns or in any other desired pattern (e.g., the antennas need not be arranged in a grid pattern having rows and columns). During signal transmission operations, radio-frequency transmission lines 42 may be used to supply signals (e.g., radio-frequency signals such as millimeter wave and/or centimeter wave signals) from millimeter/centimeter wave transceiver circuitry 38 (FIG. 3) to phased antenna array 54 for wireless transmission. During signal reception operations, radio-frequency transmission lines 42 may be used to supply signals received at phased antenna array 54 (e.g., from external wireless equipment or transmitted signals that have been reflected off of external objects) to millimeter/centimeter wave transceiver circuitry 38 (FIG. 3).

The use of multiple antennas 40 in phased antenna array 54 allows beam steering arrangements to be implemented by controlling the relative phases and magnitudes (amplitudes) of the radio-frequency signals conveyed by the antennas. In the example of FIG. 4, antennas 40 each have a corresponding radio-frequency phase and magnitude controller 50 (e.g., a first phase and magnitude controller 50-1 interposed on radio-frequency transmission line 42-1 may control phase and magnitude for radio-frequency signals handled by antenna 40-1, a second phase and magnitude controller 50-2 interposed on radio-frequency transmission line 42-2 may control phase and magnitude for radio-frequency signals handled by antenna 40-2, an Nth phase and magnitude controller 50-N interposed on radio-frequency transmission line 42-N may control phase and magnitude for radio-frequency signals handled by antenna 40-N, etc.).

Phase and magnitude controllers 50 may each include circuitry for adjusting the phase of the radio-frequency signals on radio-frequency transmission lines 42 (e.g., phase shifter circuits) and/or circuitry for adjusting the magnitude of the radio-frequency signals on radio-frequency transmission lines 42 (e.g., power amplifier and/or low noise amplifier circuits). Phase and magnitude controllers 50 may sometimes be referred to collectively herein as beam steering circuitry (e.g., beam steering circuitry that steers the beam of radio-frequency signals transmitted and/or received by phased antenna array 54).

Phase and magnitude controllers 50 may adjust the relative phases and/or magnitudes of the transmitted signals that are provided to each of the antennas in phased antenna array 54 and may adjust the relative phases and/or magnitudes of the received signals that are received by phased antenna array 54. Phase and magnitude controllers 50 may, if desired, include phase detection circuitry for detecting the phases of the received signals that are received by phased antenna array 54. The term "beam" or "signal beam" may be used herein to collectively refer to wireless signals that are transmitted and received by phased antenna array 54 in a particular direction. The signal beam may exhibit a peak gain that is oriented in a particular pointing direction at a corresponding pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 50 are adjusted to produce a first set of phases and/or magnitudes for transmitted radio-frequency signals, the transmitted signals will form a transmit beam as shown by beam B1 of FIG. 4 that is oriented in the direction of point A. If, however, phase and magnitude controllers 50 are adjusted to produce a second set of phases and/or magnitudes for the transmitted signals, the transmitted signals will form a transmit beam as shown by beam B2 that is oriented in the direction of point B. Similarly, if phase and magnitude controllers 50 are adjusted to produce the first set of phases and/or magnitudes, radio-frequency signals (e.g., radio-frequency signals in a receive beam) may be received from the direction of point A, as shown by beam B1. If phase and magnitude controllers 50 are adjusted to produce the second set of phases and/or magnitudes, radio-frequency signals may be received from the direction of point B, as shown by beam B2.

Each phase and magnitude controller 50 may be controlled to produce a desired phase and/or magnitude based on a corresponding control signal 52 received from control circuitry 28 of FIG. 2 (e.g., the phase and/or magnitude provided by phase and magnitude controller 50-1 may be controlled using control signal 52-1, the phase and/or magnitude provided by phase and magnitude controller 50-2 may be controlled using control signal 52-2, etc.). If desired, the control circuitry may actively adjust control signals 52 in real time to steer the transmit or receive beam in different desired directions over time. Phase and magnitude controllers 50 may provide information identifying the phase of received signals to control circuitry 28 if desired.

When performing wireless communications using radio-frequency signals at millimeter and centimeter wave frequencies, the radio-frequency signals are conveyed over a line of sight path between phased antenna array 54 and external communications equipment. If the external object is located at point A of FIG. 4, phase and magnitude controllers 50 may be adjusted to steer the signal beam towards point A (e.g., to steer the pointing direction of the signal beam towards point A). Phased antenna array 54 may transmit and receive radio-frequency signals in the direction of point A. Similarly, if the external communications equipment is located at point B, phase and magnitude controllers 50 may be adjusted to steer the signal beam towards point B (e.g., to steer the pointing direction of the signal beam towards point B). Phased antenna array 54 may transmit and receive radio-frequency signals in the direction of point B. In the example of FIG. 4, beam steering is shown as being performed over a single degree of freedom for the sake of simplicity (e.g., towards the left and right on the page of FIG. 4). However, in practice, the beam may be steered over two or more degrees of freedom (e.g., in three dimensions, into and out of the page and to the left and right on the page of FIG. 4). Phased antenna array 54 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Figure 5:
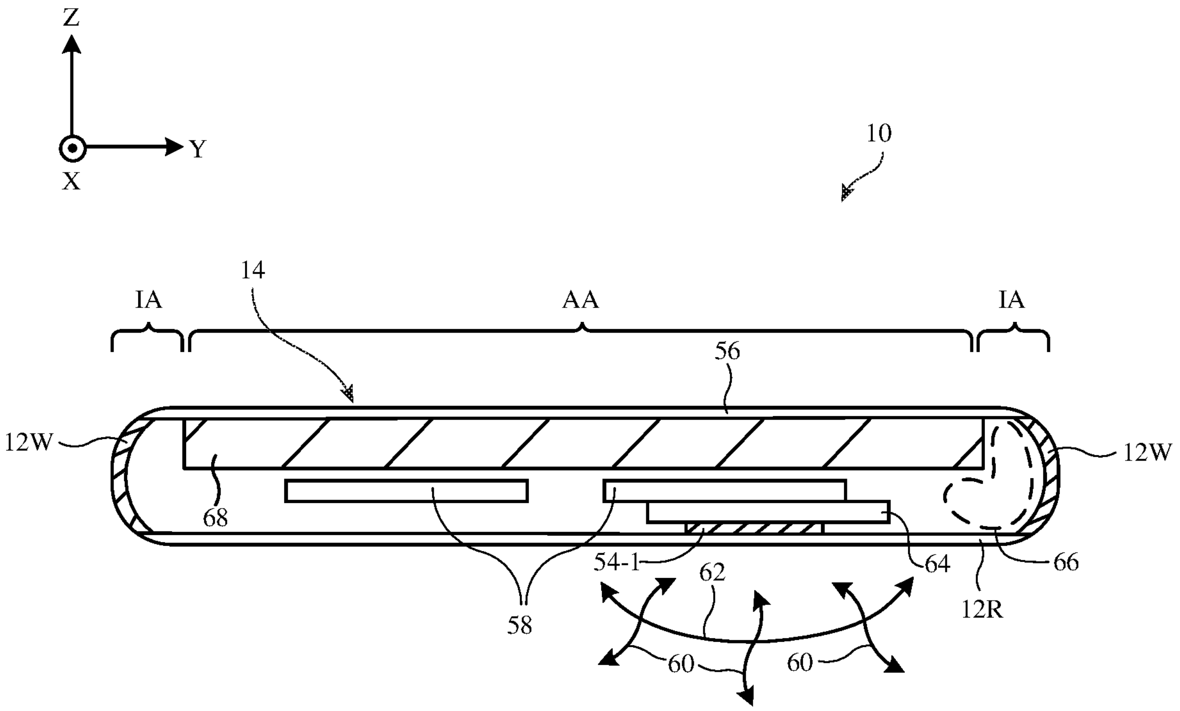
FIG. 5 is a cross-sectional side view of an illustrative electronic device having phased antenna arrays for radiating through different sides of the device in accordance with some embodiments.

FIG. 5 is a cross-sectional side view of device 10 in an example where device 10 has multiple phased antenna arrays. As shown in FIG. 5, peripheral conductive housing structures 12W may extend around the (lateral) periphery of device 10 and may extend from rear housing wall 12R to display 14. Display 14 may have a display module such as display module 68 (sometimes referred to as a display panel). Display module 68 may include pixel circuitry, touch sensor circuitry, force sensor circuitry, and/or any other desired circuitry for forming active area AA of display 14. Display 14 may include a dielectric cover layer such as display cover layer 56 that overlaps display module 68. Display module 68 may emit image light and may receive sensor input through display cover layer 56. Display cover layer 56 and display 14 may be mounted to peripheral conductive housing structures 12W. The lateral area of display 14 that does not overlap display module 68 may form inactive area IA of display 14.

Device 10 may include multiple phased antenna arrays 54 such as a rear-facing phased antenna array 54-1. As shown in FIG. 5, phased antenna array 54-1 may transmit and receive radio-frequency signals 60 at millimeter and centimeter wave frequencies through rear housing wall 12R. In scenarios where rear housing wall 12R includes metal portions, radio-frequency signals 60 may be conveyed through an aperture or opening in the metal portions of rear housing wall 12R or may be conveyed through other dielectric portions of rear housing wall 12R. The aperture may be overlapped by a dielectric cover layer or dielectric coating that extends across the lateral area of rear housing wall 12R (e.g., between peripheral conductive housing structures 12W). Phased antenna array 54-1 may perform beam steering for radio-frequency signals 60 across the hemisphere below device 10, as shown by arrow 62.

Phased antenna array 54-1 may be mounted to a substrate such as substrate 64. Substrate 64 may be an integrated circuit chip, a flexible printed circuit, a rigid printed circuit board, or other substrate. Substrate 64 may sometimes be referred to herein as antenna module 64. If desired, transceiver circuitry (e.g., millimeter/centimeter wave transceiver circuitry 38 of FIG. 2) may be mounted to antenna module 64. Phased antenna array 54-1 may be adhered to rear housing wall 12R using adhesive, may be pressed against (e.g., in contact with) rear housing wall 12R, or may be spaced apart from rear housing wall 12R.

The field of view of phased antenna array 54-1 is limited to the hemisphere under the rear face of device 10. Display module 68 and other components 58 (e.g., portions of input-output circuitry 24 or control circuitry 28 of FIG. 2, a battery for device 10, etc.) in device 10 include conductive structures. If care is not taken, these conductive structures may block radio-frequency signals from being conveyed by a phased antenna array within device 10 across the hemisphere over the front face of device 10. While an additional phased antenna array for covering the hemisphere over the front face of device 10 may be mounted against display cover layer 56 within inactive area IA, there may be insufficient space between the lateral periphery of display module 68 and peripheral conductive housing structures 12W to form all of the circuitry and radio-frequency transmission lines necessary to fully support the phased antenna array.

In order to mitigate these issues and provide coverage through the front face of device 10, a front-facing phased antenna array may be mounted within peripheral region 66 of device 10. The antennas in the front-facing phased antenna array may include dielectric resonator antennas. Dielectric resonator antennas may occupy less area in the X-Y plane of FIG. 5 than other types of antennas such as patch antennas and slot antennas. Implementing the antennas as dielectric resonator antennas may allow the radiating elements of the front-facing phased antenna array to fit within inactive area IA between display module 68 and peripheral conductive housing structures 12W. At the same time, the radio-frequency transmission lines and other components for the phased antenna array may be located behind (under) display module 68.

Figure 6:
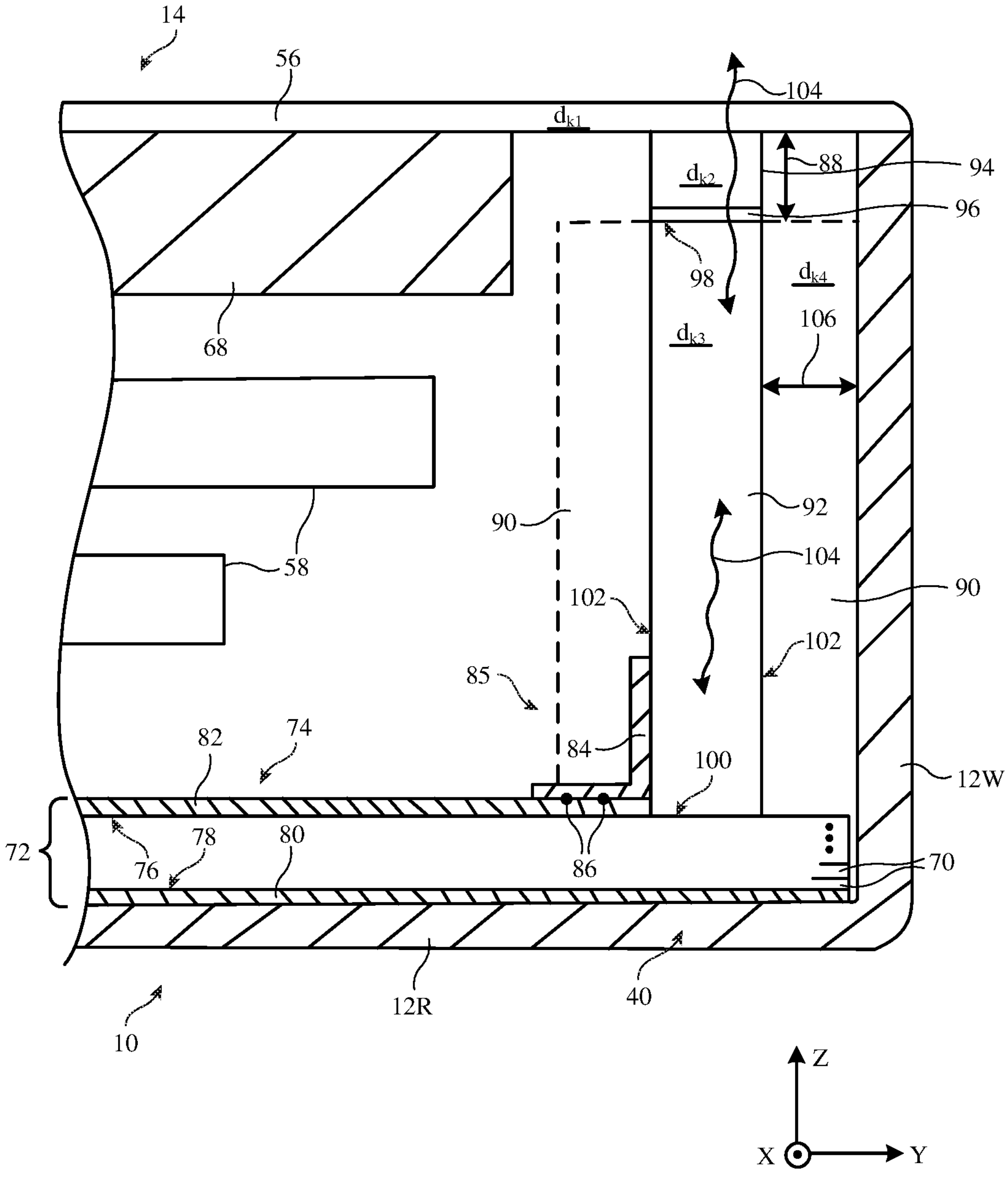
FIG. 6 is a cross-sectional side view of an illustrative probe-fed dielectric resonator antenna that may be mounted within an electronic device in accordance with some embodiments.

FIG. 6 is a cross-sectional side view of an illustrative dielectric resonator antenna in a front-facing phased antenna array for device 10. As shown in FIG. 6, device 10 may include a front-facing phased antenna array having a given antenna 40 (e.g., mounted within peripheral region 66 of FIG. 5). Antenna 40 of FIG. 6 may be a dielectric resonator antenna. In this example, antenna 40 includes a dielectric resonating element 92 mounted to an underlying substrate such as flexible printed circuit 72. This example is merely illustrative and, if desired, flexible printed circuit 72 may be replaced with a rigid printed circuit board, a plastic substrate, or any other desired substrate.

Flexible printed circuit 72 has a lateral area (e.g., in the X-Y plane of FIG. 6) that extends along rear housing wall 12R. Flexible printed circuit 72 may be adhered to rear housing wall 12R using adhesive, may be pressed against (e.g., placed in contact with) rear housing wall 12R, or may be separated from rear housing wall 12R. Flexible printed circuit 72 may have a first end at antenna 40 and an opposing second end coupled to the millimeter/centimeter wave transceiver circuitry in device 10 (e.g., millimeter/centimeter wave transceiver circuitry 38 of FIG. 2). In one suitable arrangement, the second end of flexible printed circuit 72 may be coupled to antenna module 64 of FIG. 5.

As shown in FIG. 6, flexible printed circuit 72 may include stacked dielectric layers 70. Dielectric layers 70 may include polyimide, ceramic, liquid crystal polymer, plastic, and/or any other desired dielectric materials. Conductive traces such as conductive traces 82 may be patterned on a top surface 76 of flexible printed circuit 72. Conductive traces such as conductive traces 80 may be patterned on an opposing bottom surface 78 of flexible printed circuit 72. Conductive traces 80 may be held at a ground potential and may therefore sometimes be referred to herein as ground traces 80. Ground traces 80 may be shorted to additional ground traces within flexible printed circuit 72 and/or on top surface 76 of flexible printed circuity 72 using conducive vias that extend through flexible printed circuit 72 (not shown in FIG. 6 for the sake of clarity). Ground traces 80 may form part of the antenna ground for antenna 40. Ground traces 80 may be coupled to a system ground in device 10 (e.g., using solder, welds, conductive adhesive, conductive tape, conductive brackets, conductive pins, conductive screws, conductive clips, combinations of these, etc.). For example, ground traces 80 may be coupled to peripheral conductive housing structures 12W, conductive portions of rear housing wall 12R, or other grounded structures in device 10. The example of FIG. 6 in which conductive traces 82 are formed on top surface 76 and ground traces 80 are formed on bottom surface 78 of flexible printed circuit 72 is merely illustrative. If desired, one or more dielectric layers 70 may be layered over conductive traces 82 and/or one or more dielectric layers 70 may be layered under ground traces 80.

Antenna 40 may be fed using a radio-frequency transmission line that is formed on and/or embedded within flexible printed circuit 72 such as radio-frequency transmission line 74. Radio-frequency transmission line 74 (e.g., a given radio-frequency transmission line 42 of FIG. 3) may include ground traces 80 and conductive traces 82. The portion of ground traces 80 overlapping conductive traces 82 may form the ground conductor for radio-frequency transmission line 74 (e.g., ground conductor 48 of FIG. 3). Conductive traces 82 may form the signal conductor for radio-frequency transmission line 74 (e.g., signal conductor 46 of FIG. 3) and may therefore sometimes be referred to herein as signal traces 82. Radio-frequency transmission line 74 may convey radio-frequency signals between antenna 40 and the millimeter/centimeter wave transceiver circuitry. The example of FIG. 6 in which antenna 40 is fed using signal traces 82 and ground traces 80 is merely illustrative. In general, antenna 40 may be fed using any desired transmission line structures in and/or on flexible printed circuit 72.

Dielectric resonating element 92 of antenna 40 may be formed from a column (pillar) of dielectric material mounted to top surface 76 of flexible printed circuit 72. If desired, dielectric resonating element 92 may be embedded within (e.g., laterally surrounded by) a dielectric substrate mounted to top surface 76 of flexible printed circuit 72 such as dielectric substrate 90. Dielectric substrate 90 and dielectric resonating element 92 extend from a bottom surface 100 at flexible printed circuit 72 to an opposing top surface 98 at display 14.

The operating (resonant) frequency of antenna 40 may be selected by adjusting the dimensions of dielectric resonating element 92 (e.g., in the direction of the X, Y, and/or Z axes of FIG. 6). Dielectric resonating element 92 may be formed from a column of dielectric material having dielectric constant do. Dielectric constant $d_{k3}$ may be relatively high (e.g., greater than 10.0, greater than 12.0, greater than 15.0, greater than 20.0, between 15.0 and 40.0, between 10.0 and 50.0, between 18.0 and 30.0, between 12.0 and 45.0, etc.). In one suitable arrangement, dielectric resonating element 92 may be formed from zirconia or a ceramic material. Other dielectric materials may be used to form dielectric resonating element 92 if desired.

Dielectric substrate 90 may be formed from a material having dielectric constant $d_{k4}$. Dielectric constant $d_{k4}$ may be less than dielectric constant do of dielectric resonating element 92 (e.g., less than 18.0, less than 15.0, less than 10.0, between 3.0 and 4.0, less than 5.0, between 2.0 and 5.0, etc.). Dielectric constant $d_{k4}$ may be less than dielectric constant do by at least 10.0, 5.0, 15.0, 12.0, 6.0, etc. In one suitable arrangement, dielectric substrate 90 may be formed from molded plastic (e.g., injection molded plastic). Other dielectric materials may be used to form dielectric substrate 90 or dielectric substrate 90 may be omitted if desired. The difference in dielectric constant between dielectric resonating element 92 and dielectric substrate 90 may establish a radio-frequency boundary condition between dielectric resonating element 92 and dielectric substrate 90 from bottom surface 100 to top surface 98. This may configure dielectric resonating element 92 to serve as a waveguide for propagating radio-frequency signals at millimeter and centimeter wave frequencies.

Dielectric substrate 90 may have a width (thickness) 106 on each side of dielectric resonating element 92. Width 106 may be selected to isolate dielectric resonating element 92 from peripheral conductive housing structures 12W and to minimize signal reflections in dielectric substrate 90. Width 106 may be, for example, at least one-tenth of the effective wavelength of the radio-frequency signals in a dielectric material of dielectric constant $d_{k4}$. Width 106 may be 0.4-0.5 mm, 0.3-0.5 mm, 0.2-0.6 mm, greater than 0.1 mm, greater than 0.3 mm, 0.2-2.0 mm, 0.3-1.0 mm, or greater than between 0.4 and 0.5 mm, as examples.

Dielectric resonating element 92 may radiate radio-frequency signals 104 when excited by the signal conductor for radio-frequency transmission line 74. In some scenarios, a slot is formed in ground traces on top surface 76 of flexible printed circuit, the slot is indirectly fed by a signal conductor embedded within flexible printed circuit 72, and the slot excites dielectric resonating element 92 to radiate radio-frequency signals 104. However, in these scenarios, the radiating characteristics of the antenna may be affected by how the dielectric resonating element is mounted to flexible printed circuit 72. For example, air gaps or layers of adhesive used to mount the dielectric resonating element to the flexible printed circuit can be difficult to control and can undesirably affect the radiating characteristics of the antenna. In order to mitigate the issues associated with exciting dielectric resonating element 92 using an underlying slot, antenna 40 may be fed using a radio-frequency feed probe such as feed probe 85. Feed probe 85 may form part of the antenna feed for antenna 40 (e.g., antenna feed 44 of FIG. 3).

As shown in FIG. 6, feed probe 85 may be formed from conductive traces 84. Conductive traces 84 may include a first portion patterned onto a given sidewall 102 of dielectric resonating element 92 (e.g., a conductive patch on sidewall 102 formed using a sputtering process or other conductive deposition techniques). Conductive traces 84 may include a second portion coupled to signal traces 82 using conductive interconnect structures 86. Conductive interconnect structures 86 may include solder, welds, conductive adhesive, conductive tape, conductive foam, conductive springs, conductive brackets, and/or any other desired conductive interconnect structures. Feed probe 85 may be formed from any desired conductive structures (e.g., conductive traces, conductive foil, sheet metal, and/or other conductive structures).

Signal traces 82 may convey radio-frequency signals to and from feed probe 85. Feed probe 85 may electromagnetically couple the radio-frequency signals on signal traces 82 into dielectric resonating element 92. This may serve to excite one or more electromagnetic modes (e.g., radio-frequency cavity or waveguide modes) of dielectric resonating element 92. When excited by feed probe 85, the electromagnetic modes of dielectric resonating element 92 may configure the dielectric resonating element to serve as a waveguide that propagates the wavefronts of radio-frequency signals 104 along the length of dielectric resonating element 92 (e.g., in the direction of the Z-axis of FIG. 6), through top surface 98, and through display 14.

For example, during signal transmission, radio-frequency transmission line 74 may supply radio-frequency signals from the millimeter/centimeter wave transceiver circuitry to antenna 40. Feed probe 85 may couple the radio-frequency signals on signal traces 82 into dielectric resonating element 92. This may serve to excite one or more electromagnetic modes of dielectric resonating element 92, resulting in the propagation of radio-frequency signals 104 up the length of dielectric resonating element 92 and to the exterior of device 10 through display cover layer 56. Similarly, during signal reception, radio-frequency signals 104 may be received through display cover layer 56. The received radio-frequency signals may excite the electromagnetic modes of dielectric resonating element 92, resulting in the propagation of the radio-frequency signals down the length of dielectric resonating element 92. Feed probe 85 may couple the received radio-frequency signals onto radio-frequency transmission line 74, which passes the radio-frequency signals to the millimeter/centimeter wave transceiver circuitry. The relatively large difference in dielectric constant between dielectric resonating element 92 and dielectric substrate 90 may allow dielectric resonating element 92 to convey radio-frequency signals 104 with a relatively high antenna efficiency (e.g., by establishing a strong boundary between dielectric resonating element 92 and dielectric substrate 90 for the radio-frequency signals). The relatively high dielectric constant of dielectric resonating element 92 may also allow the dielectric resonating element 92 to occupy a relatively small volume compared to scenarios where materials with a lower dielectric constant are used.

The dimensions of feed probe 85 (e.g., in the direction of the X-axis and Z-axis of FIG. 6) may be selected to help match the impedance of radio-frequency transmission line 74 to the impedance of dielectric resonating element 92. Feed probe 85 may be located on a particular sidewall 102 of dielectric resonating element 92 to provide antenna 40 with a desired linear polarization (e.g., a vertical or horizontal polarization). If desired, multiple feed probes 85 may be formed on multiple sidewalls 102 of dielectric resonating element 92 to configure antenna 40 to cover multiple orthogonal linear polarizations at once. The phase of each feed probe may be independently adjusted over time to provide the antenna with other polarizations such as an elliptical or circular polarization if desired. Feed probe 85 may sometimes be referred to herein as feed conductor 85, feed patch 85, or probe feed 85. Dielectric resonating element 92 may sometimes be referred to herein as a dielectric radiating element, dielectric radiator, dielectric resonator, dielectric antenna resonating element, dielectric column, dielectric pillar, radiating element, or resonating element. When fed by one or more feed probes such as feed probe 85, dielectric resonator antennas such as antenna 40 of FIG. 6 may sometimes be referred to herein as probe-fed dielectric resonator antennas.

Display cover layer 56 may be formed from a dielectric material having dielectric constant $d_{k1}$ that is less than dielectric constant do. For example, dielectric constant may be between about 3.0 and 10.0 (e.g., between 4.0 and 9.0, between 5.0 and 8.0, between 5.5 and 7.0, between 5.0 and 7.0, etc.). In one suitable arrangement, display cover layer 56 may be formed from glass, plastic, or sapphire. If care is not taken, the relatively large difference in dielectric constant between display cover layer 56 and dielectric resonating element 92 may cause undesirable signal reflections at the boundary between the display cover layer and the dielectric resonating element. These reflections may result in destructive interference between the transmitted and reflected signals and in stray signal loss that undesirably limits the antenna efficiency of antenna 40.

In order to mitigate effects, antenna 40 may be provided with an impedance matching layer such as dielectric matching layer 94. Dielectric matching layer 94 may be mounted to top surface 98 of dielectric resonating element 92 between dielectric resonating element 92 and display cover layer 56. If desired, dielectric matching layer 94 may be adhered to dielectric resonating element 92 using a layer of adhesive 96. Adhesive may also or alternatively be used to adhere dielectric matching layer 94 to display cover layer 56 if desired. Adhesive 96 may be relatively thin so as not to significantly affect the propagation of radio-frequency signals 104.

Dielectric matching layer 94 may be formed from a dielectric material having dielectric constant $d_{k2}$. Dielectric constant $d_{k2}$ may be greater than dielectric constant dki and less than dielectric constant $d_{k3}$. As an example, dielectric constant $d_{k2}$ may be equal to SQRT($d_{k1}$*$d_{k3}$), where SQRT ( ) is the square root operator and "*" is the multiplication operator. The presence of dielectric matching layer 94 may allow radio-frequency signals to propagate without facing a sharp boundary between the material of dielectric constant $d_{k1}$ and the material of dielectric constant $d_{k3}$, thereby helping to reduce signal reflections.

Dielectric matching layer 94 may be provided with thickness 88. Thickness 88 may be selected to be approximately equal to (e.g., within 15% of) one-quarter of the effective wavelength of radio-frequency signals 104 in dielectric matching layer 94. The effective wavelength is given by dividing the free space wavelength of radio-frequency signals 104 (e.g., a centimeter or millimeter wavelength corresponding to a frequency between 10 GHz and 300 GHz) by a constant factor (e.g., the square root of $d_{k3}$). When provided with thickness 88, dielectric matching layer 94 may form a quarter wave impedance transformer that mitigates any destructive interference associated with the reflection of radio-frequency signals 104 at the boundaries between display cover layer 56, dielectric matching layer 94, and dielectric resonating element 92.

When configured in this way, antenna 40 may radiate radio-frequency signals 104 through the front face of device 10 despite being coupled to the millimeter/centimeter wave transceiver circuitry over a flexible printed circuit located at the rear of device 10. The relatively narrow width of dielectric resonating element 92 may allow antenna 40 to fit in the volume between display module 68, other components 58, and peripheral conductive housing structures 12W. Antenna 40 of FIG. 6 may be formed in a front-facing phased antenna array that conveys radio-frequency signals across at least a portion of the hemisphere above the front face of device 10.

Figure 7:
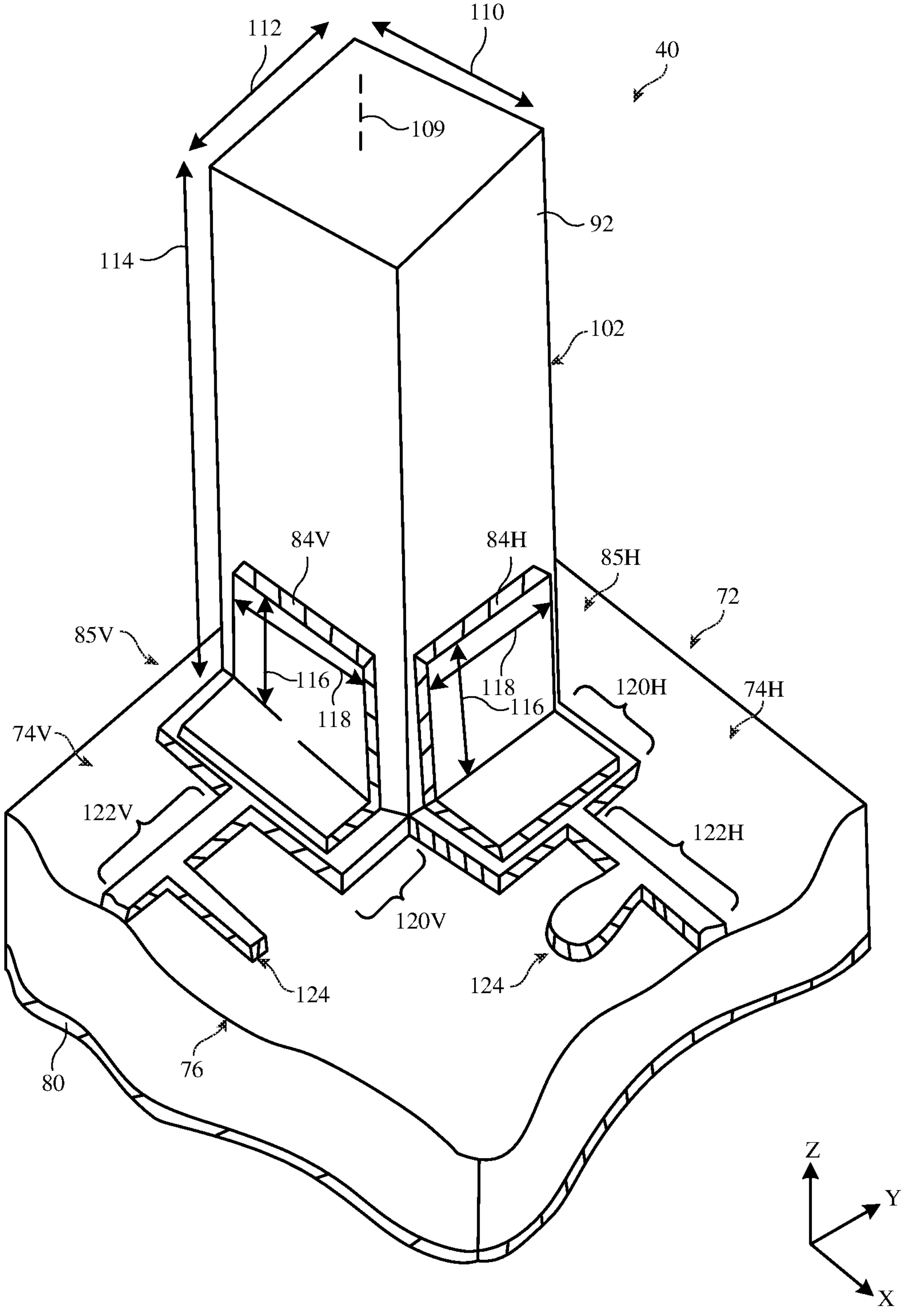
FIG. 7 is a perspective view of an illustrative probe-fed dielectric resonator antenna for covering multiple polarizations in accordance with some embodiments.

FIG. 7 is a perspective view of the probe-fed dielectric resonator antenna of FIG. 6 in a scenario where the dielectric resonating element is fed using multiple feed probes for covering multiple polarizations. Peripheral conductive housing structures 12W, dielectric substrate 90, dielectric matching layer 94, adhesive 96, rear housing wall 12R, display 14, and other components 58 of FIG. 6 are omitted from FIG. 7 for the sake of clarity.

As shown in FIG. 7, dielectric resonating element 92 of antenna 40 is mounted to top surface 76 of flexible printed circuit 72. Antenna 40 may be fed using multiple feed probes 85 such as a first feed probe 85V and a second feed probe 85H mounted to dielectric resonating element 92 and flexible printed circuit 72. Feed probe 85V includes conductive traces 84V patterned on a first sidewall 102 of dielectric resonating element 92. Feed probe 85H includes conductive traces 84H patterned on a second (orthogonal) sidewall 102 of dielectric resonating element 92.

Antenna 40 may be fed using multiple radio-frequency transmission lines 74 such as a first radio-frequency transmission line 74V and a second radio-frequency transmission line 74H. First radio-frequency transmission line 74V may include conductive traces 122V and 120V on top surface 76 of flexible printed circuit 72. Conductive traces 122V and 120V may form part of the signal conductor (e.g., signal traces 82 of FIG. 6) for radio-frequency transmission line 74V. Similarly, second radio-frequency transmission line 74H may include conductive traces 122H and 120H on top surface 76 of flexible printed circuit 72. Conductive traces 122H and 120H may form part of the signal conductor (e.g., signal traces 82 of FIG. 6) for radio-frequency transmission line 74H.

Conductive trace 122V may be narrower than conductive trace 120V. Conductive trace 122H may be narrower than conductive trace 120H. Conductive traces 120V and 120H may, for example, be conductive contact pads on top surface 76 of flexible printed circuit 72. Conductive traces 84V of feed probe 85V may be mounted and coupled to conductive trace 120V (e.g., using conductive interconnect structures 86 of FIG. 6). Similarly, conductive traces 84H of feed probe 85H may be mounted and coupled to conductive trace 120H.

Radio-frequency transmission line 74V and feed probe 85V may convey first radio-frequency signals having a first linear polarization (e.g., a vertical polarization). When driven using the first radio-frequency signals, feed probe 85V may excite one or more electromagnetic modes of dielectric resonating element 92 associated with the first polarization. When excited in this way, wave fronts associated with the first radio-frequency signals may propagate along the length of dielectric resonating element 92 (e.g., along central/longitudinal axis 109) and may be radiated through the display (e.g., through display cover layer 56 of FIG. 6).

Similarly, radio-frequency transmission line 74H and feed probe 85H may convey radio-frequency signals of a second linear polarization orthogonal to the first polarization (e.g., a horizontal polarization). When driven using the second radio-frequency signals, feed probe 85H may excite one or more electromagnetic modes of dielectric resonating element 92 associated with the second polarization. When excited in this way, wave fronts associated with the second radio-frequency signals may propagate along the length of dielectric resonating element 92 and may be radiated through the display (e.g., through display cover layer 56 of FIG. 6). Both feed probes 85H and 85V may be active at once so that antenna 40 conveys both the first and second radio-frequency signals at any given time. In another suitable arrangement, a single one of feed probes 85H and 85V may be active at once so that antenna 40 conveys radio-frequency signals of only a single polarization at any given time.

Dielectric resonating element 92 may have a length 110, width 112, and height 114. Length 110, width 112, and height 114 may be selected to provide dielectric resonating element 92 with a corresponding mix of electromagnetic cavity/waveguide modes that, when excited by feed probes 85H and/or 85V, configure antenna 40 to radiate at desired frequencies. For example, height 114 may be 2-10 mm, 4-6 mm, 3-7 mm, 4.5-5.5 mm, or greater than 2 mm. Width 112 and length 110 may each be 0.5-1.0 mm, 0.4-1.2 mm, 0.7-0.9 mm, 0.5-2.0 mm, 1.5 mm-2.5 mm, 1.7 mm-1.9 mm, 1.0 mm-3.0 mm, etc. Width 112 may be equal to length 110 or, in other arrangements, may be different than length 110. Sidewalls 102 of dielectric resonating element 92 may contact the surrounding dielectric substrate (e.g., dielectric substrate 90 of FIG. 6). The dielectric substrate may be molded over feed probes 85H and 85V or may include openings, notches, or other structures that accommodate the presence of feed probes 85H and 85V. The example of FIG. 7 is merely illustrative and, if desired, dielectric resonating element 92 may have other shapes (e.g., shapes with any desired number of straight and/or curved sidewalls 102).

Conductive traces 84V and 84H may each have width 118 and height 116. Width 118 and height 116 may be selected to match the impedance of radio-frequency transmission lines 74V and 74H to the impedance of dielectric resonating element 92. As an example, width 118 may be between 0.3 mm and 0.7 mm, between 0.2 mm and 0.8 mm, between 0.4 mm and 0.6 mm, or other values. Height 116 may be between 0.3 mm and 0.7 mm, between 0.2 mm and 0.8 mm, between 0.4 mm and 0.6 mm, or other values. Height 116 may be equal to width 118 or may be different than width 118.

If desired, transmission lines 74V and 74H may include one or more transmission line matching stubs such as matching stubs 124 coupled to traces 122V and 122H. Matching stubs 124 may help to ensure that the impedance of radio-frequency transmission lines 74H and 74V are matched to the impedance of dielectric resonating element 92. Matching stubs 124 may have any desired shape or may be omitted. Conductive traces 84V and 84H may have other shapes (e.g., shapes having any desired number of straight and/or curved edges).

Figure 8:
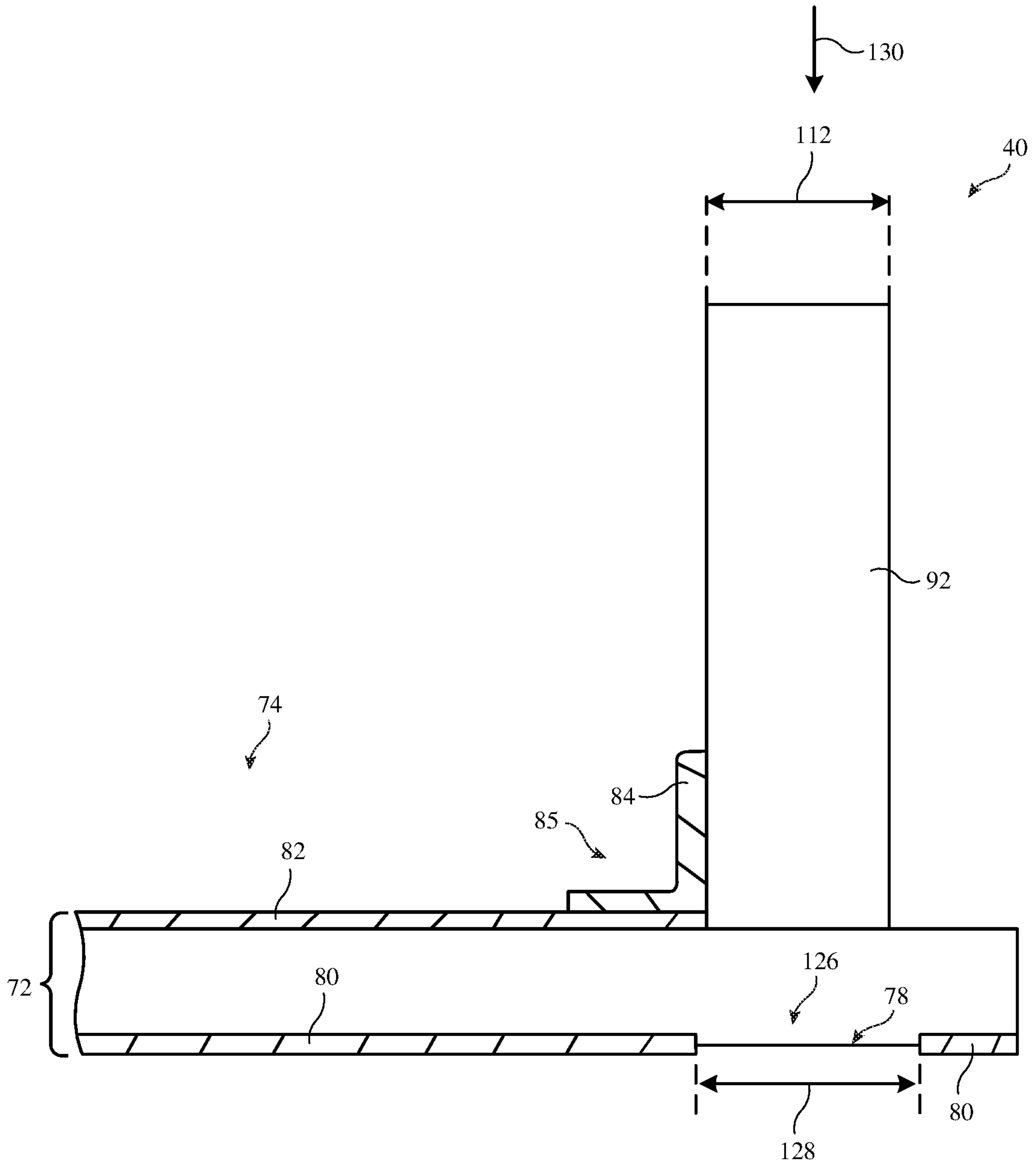
FIG. 8 is a cross-sectional side view of an illustrative probe-fed dielectric resonator antenna that overlaps an opening in ground traces in accordance with some embodiments.

If desired, a slot may be formed in ground traces 80 on flexible printed circuit 72 to help match the impedance of the radio-frequency transmission line(s) to dielectric resonating element 92. FIG. 8 is a cross-sectional side view of antenna 40 showing how ground traces 80 may include an opening to help match the impedance of the radio-frequency transmission line(s) to dielectric resonating element 92. In the example of FIG. 8, only a single feed probe is shown and peripheral conductive housing structures 12W, dielectric substrate 90, dielectric matching layer 94, adhesive 96, rear housing wall 12R, display 14, and other components 58 of FIG. 6 are omitted for the sake of clarity.

As shown in FIG. 8, ground traces 80 may include a slot or opening such as slot 126 at bottom surface 78 of flexible printed circuit 72. Dielectric resonating element 92 of antenna 40 may be mounted to flexible printed circuit 72 and may be aligned with the underlying slot 126. Slot 126 may have a width 128. Width 128 may, for example, be greater than or equal to width 112 of dielectric resonating element 92 (e.g., an entirety of the lateral area of dielectric resonating element 92 may overlap slot 126). Slot 126 may help to match the impedance of transmission line 74 to the impedance of dielectric resonating element 92. If desired, the presence of slot 126 may also allow feed probe 85 to excite additional electromagnetic modes of dielectric resonating element 92 to expand the frequencies and/or bandwidth covered by antenna 40. Width 128 may be adjusted to optimize impedance matching between radio-frequency transmission line 74 and dielectric resonating element 92 and/or to tune the frequency response (e.g., peak response frequency and bandwidth) of antenna 40. In addition, slot 126 may serve to minimize coupling between two linear polarizations (e.g., horizontal and vertical polarizations) in dielectric resonating element 92. For example, slot 126 may help to disturb ground current flow between the transceiver ports associated with transmission lines 74V and 74H (FIG. 7).

Figure 9:
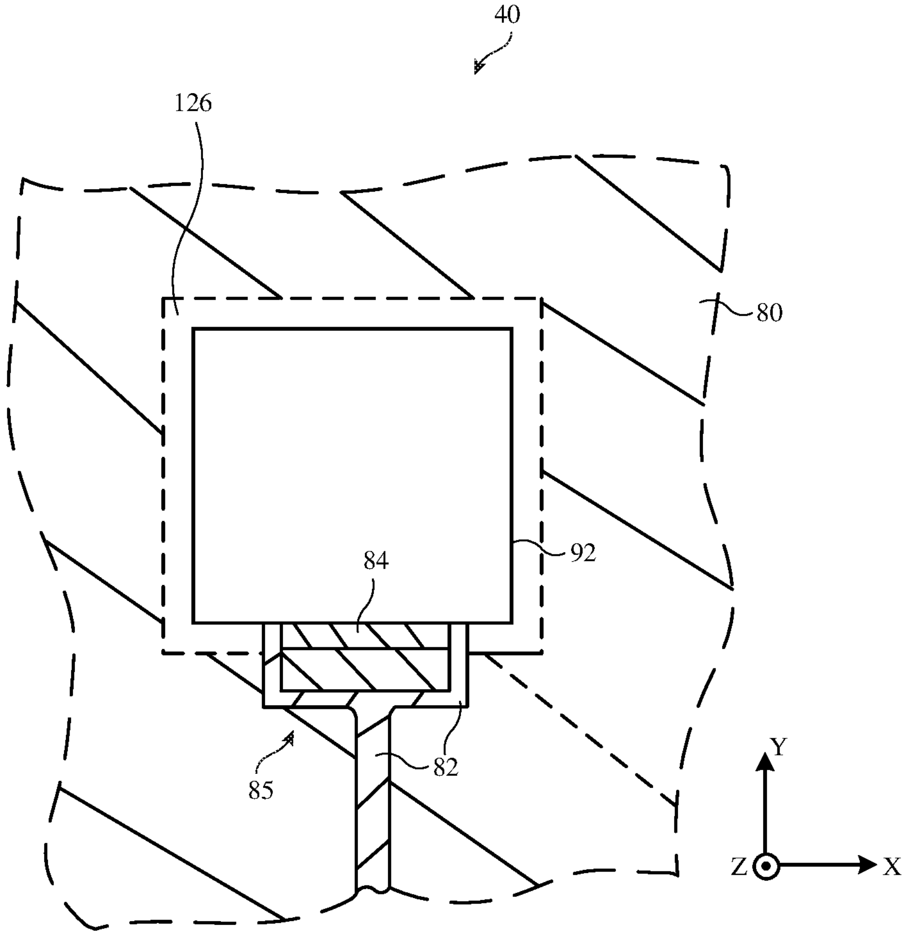
FIG. 9 is a top-down view of an illustrative probe-fed dielectric resonator antenna that overlaps an opening in ground traces in accordance with some embodiments.

FIG. 9 is a top-down view of antenna 40 showing how dielectric resonating element 92 may overlap an underlying slot 126 in ground traces 80 (e.g., as taken in the direction of arrow 130 of FIG. 8). In the example of FIG. 9, the dielectric material in flexible printed circuit 72 of FIG. 8 has been omitted for the sake of clarity.

As shown in FIG. 9, dielectric resonating element 92 may be aligned with slot 126 in the underlying ground traces 80. Slot 126 may have a rectangular shape (e.g., the same shape as the lateral shape of dielectric resonating element 92) or may have other shapes. Signal traces 82 may be coupled to conductive traces 84 in a corresponding feed probe 85 located on a given sidewall of dielectric resonating element 92. This example is merely illustrative and, if desired, additional feed probes and radio-frequency transmission lines may be provided to cover additional polarizations.

In practice, if care is not taken, dielectric resonator antennas such as antenna 40 can be subject to undesirable cross-polarization interference. Cross-polarization interference can occur when radio-frequency signals to be conveyed in a first polarization are undesirably transmitted or received using an antenna feed that is used to convey radio-frequency signals in a second polarization. For example, cross-polarization interference may involve the leakage of horizontally-polarized signals onto feed probe 85V of FIG. 7 (e.g., a feed probe intended to convey vertically-polarized signals) and/or the leakage of vertically-polarized signals onto feed probe 85H of FIG. 7 (e.g., a feed probe intended to convey horizontally-polarized signals). The cross-polarization interference can arise when the electric field produced by feed probe 85V has components oriented at a mix of different angles or when the electric field produced by feed probe 85H has components oriented at a mix of different angles within dielectric resonating element 92. Cross-polarization interference can lead to a decrease in overall data throughput, errors in the transmitted or received data, or otherwise degraded antenna performance. These effects are also particularly detrimental in scenarios where antenna 40 conveys independent data streams using horizontal and vertical polarizations (e.g., under a MIMO scheme), as the cross-polarization interference reduces the independence of the data streams. It would therefore be desirable to be able to provide a dielectric resonator antenna such as antenna 40 with structures for mitigating cross polarization interference (e.g., for maximizing isolation between polarizations handled by the antenna).

Figure 10:
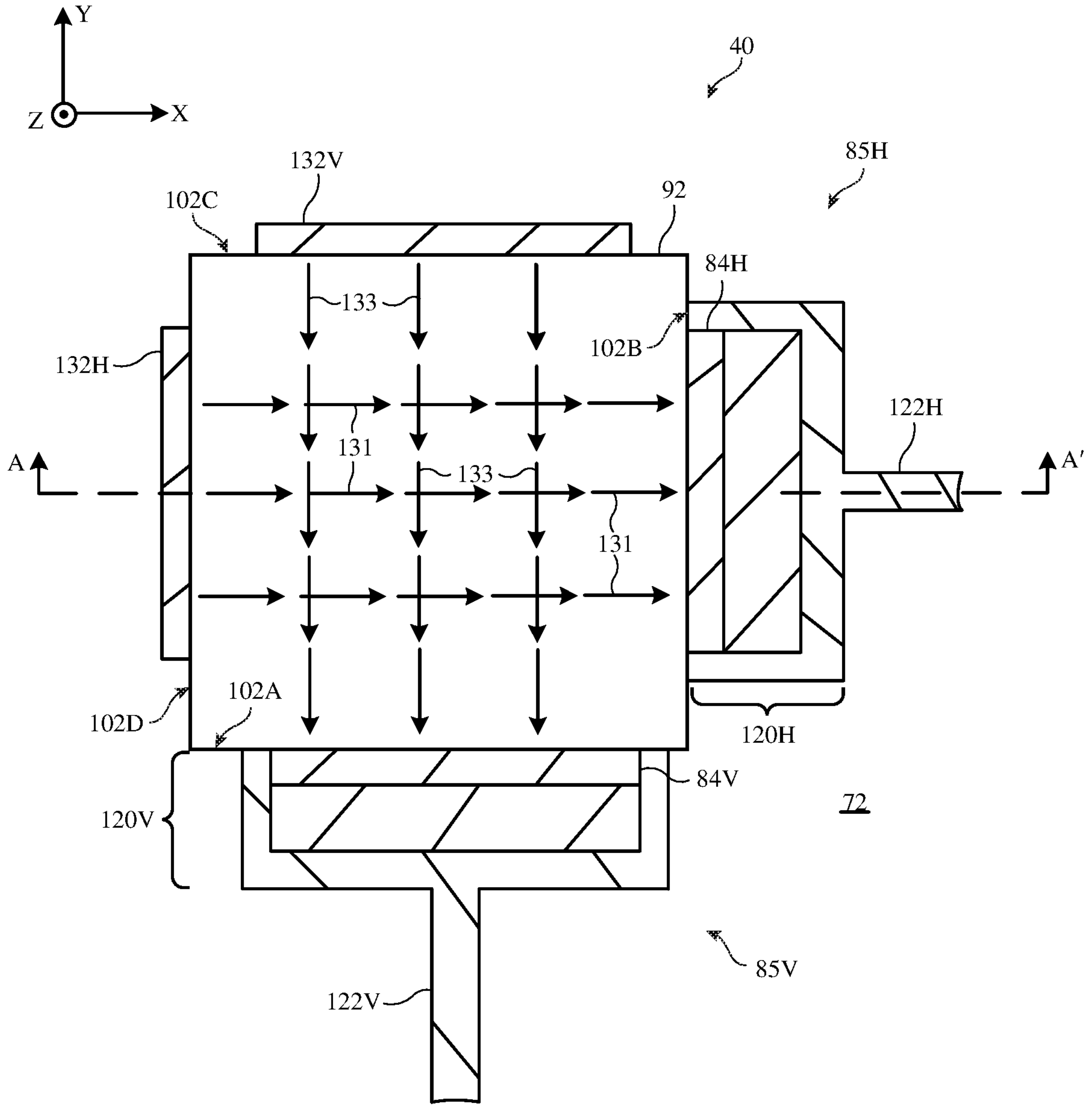
FIG. 10 is a top-down view of an illustrative probe-fed dielectric resonator antenna having multiple feed probes and floating parasitic patches for mitigating cross-polarization interference in accordance with some embodiments.

FIG. 10 is a top-down view of antenna 40 having structures for mitigating cross polarization interference. In the example of FIG. 10, antenna 40 is a dual-polarization dielectric resonator antenna having feed probes 85V and 85H for exciting different polarizations of dielectric resonating element 92.

As shown in FIG. 10, dielectric resonating element 92 may have a rectangular lateral profile. Dielectric resonating element 92 may have four sidewalls 102 (e.g., four vertical faces or surfaces) such as a first sidewall 102A, a second sidewall 102B, a third sidewall 102C, and a fourth sidewall 102D. Third sidewall 102C may oppose first sidewall 102A and fourth sidewall 102D may oppose second sidewall 102B on dielectric resonating element 92. Conductive traces 84V of feed probe 85V may be patterned onto first sidewall 102A. Conductive traces 84V may also be coupled to conductive trace 120V on the underlying flexible printed circuit 72. Conductive trace 122V may be coupled to conductive trace 120V. Similarly, conductive traces 84H of feed probe 85H may be patterned onto second sidewall 102B. Conductive traces 84V may also be coupled to conductive trace 120H on flexible printed circuit 72. Conductive trace 122H may be coupled to conductive trace 120H.

In order to mitigate cross polarization interference, parasitic elements such as parasitic elements 132H and 132V may be patterned onto the sidewalls of dielectric resonating element 92. Parasitic elements 132H and 132V may, for example, be formed from floating patches of conductive material patterned onto the sidewalls of dielectric resonating element 92 (e.g., conductive patches that are not coupled to ground or the signal traces for antenna 40). As shown in FIG. 10, parasitic element 132H may be patterned onto fourth sidewall 102D opposite feed probe 85H. Parasitic element 132V may be patterned onto third sidewall 102C opposite first feed probe 85V.

The presence of the conductive material in parasitic element 132H may serve to change the boundary condition for the electric field excited by feed probe 85H within dielectric resonating element 92. For example, in scenarios where parasitic element 132H is omitted, the electric field excited by feed probe 85H may include a mix of different electric field components oriented in different directions. This may lead to cross-polarization interference in which some vertically-polarized signals undesirably leak onto feed probe 85H. However, the boundary condition created by parasitic element 132H may serve to align the electric field excited by feed probe 85H in a single direction between sidewalls 102B and 102D, as shown by arrows 131 (e.g., in a horizontal direction parallel to the X-axis). Because the entire electric field excited by feed probe 85H is horizontal, feed probe 85H may only convey horizontally-polarized signals without vertically-polarized signals interfering with the horizontally-polarized signals.

Similarly, the presence of the conductive material in parasitic element 132V may serve to change the boundary condition for the electric field excited by feed probe 85V within dielectric resonating element 92. For example, in scenarios where parasitic element 132V is omitted, the electric field excited by feed probe 85V may include a mix of different electric field components oriented in different directions. This may lead to cross-polarization interference in which some horizontally-polarized signals undesirably leak onto feed probe 85V. However, the boundary condition created by parasitic element 132V may serve to align the electric field excited by feed probe 85V in a single direction between sidewalls 102A and 102C, as shown by arrows 133 (e.g., in a vertical direction parallel to the Y-axis). Because the entire electric field excited by feed probe 85V is vertical, feed probe 85V may only convey vertically-polarized signals without horizontally-polarized signals interfering with the vertically-polarized signals.

Parasitic element 132V may have a shape (e.g., lateral dimensions in the X-Z plane) that matches the shape of the portion of conductive traces 84V on sidewall 102A (e.g., parasitic element 132V may have width 118 and height 116 of FIG. 7. Similarly, parasitic element 132H may have a shape (e.g., lateral dimensions in the Y-Z plane) that matches the shape of the portion of conductive traces 84H on sidewall 102B (e.g., parasitic element 132H may have width 118 and height 116 of FIG. 7). This may ensure that there are symmetric boundary conditions between feed probe 85V and parasitic element 132V and between feed probe 85H and parasitic element 132H. Parasitic element 132V need not have the same exact dimensions as feed probe 85V and parasitic element 132H need not have the same exact dimensions as feed probe 85H if desired.

Figure 11:
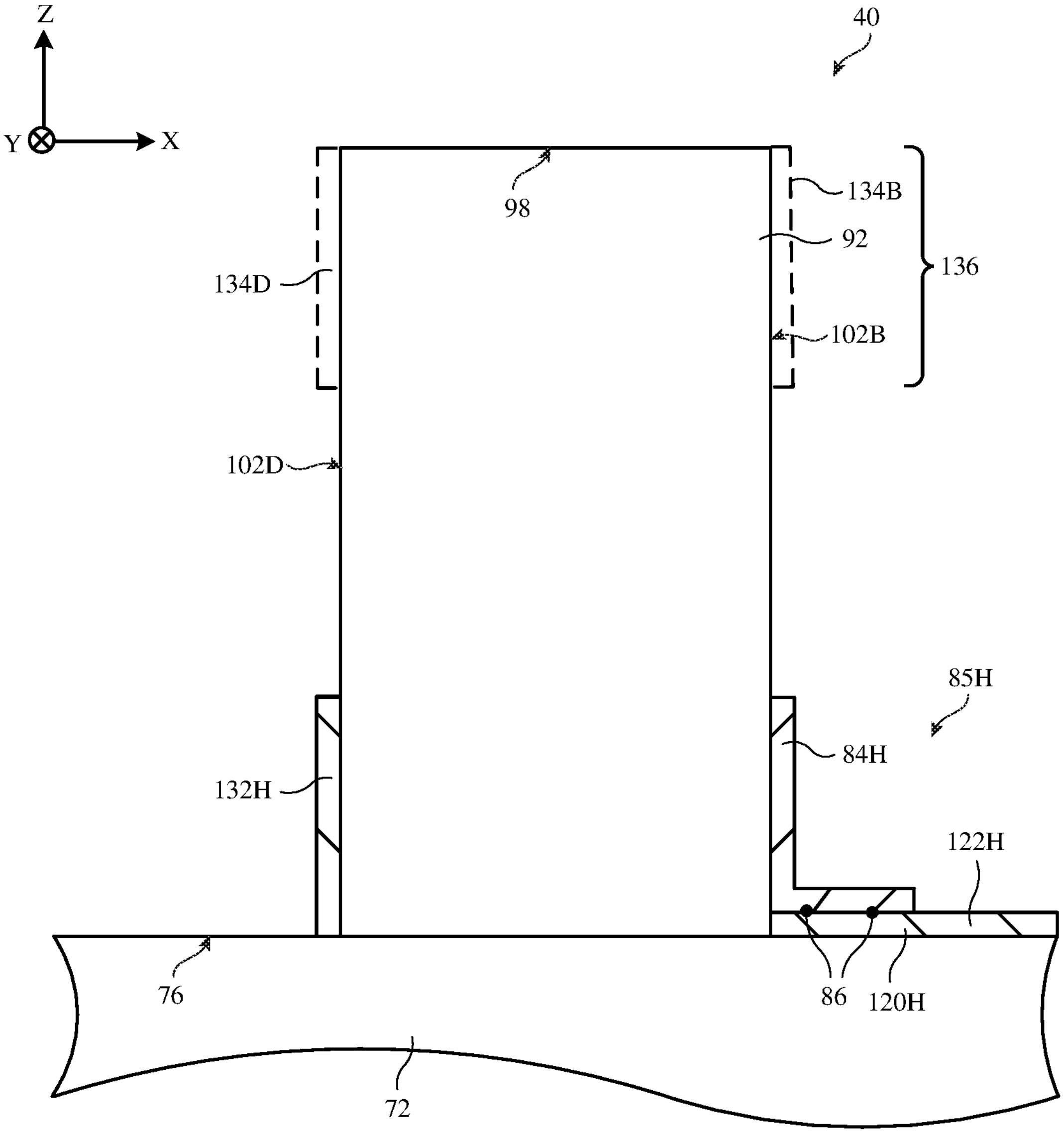
FIG. 11 is a cross-sectional side view of an illustrative probe-fed dielectric resonator antenna having multiple feed probes and floating parasitic patches for mitigating cross-polarization interference in accordance with some embodiments.

FIG. 11 is a cross-sectional side view of antenna 40 having parasitic elements 132H and 132V (e.g., as taken along line AA' of FIG. 10). As shown in FIG. 11, conductive traces 84H of feed probe 85H may be coupled to trace 120H using conductive interconnect structures 86 (e.g., solder). Parasitic element 132H may be formed on sidewall 102D of dielectric resonating element 92 opposite feed probe 85H. Parasitic element 132H may have the same dimensions as the portion of conductive traces 84H patterned onto sidewall 102B of dielectric resonating element 92. Parasitic element 132H may extend downward to top surface 76 of flexible printed circuit 72 if desired. Parasitic element 132H is not coupled to signal traces for antenna 40 or ground traces for antenna 40 (e.g., parasitic element 132H is a floating parasitic patch on sidewall 102D). If desired, parasitic element 132H may be soldered to floating traces on top surface 76 of flexible printed circuit 72 (e.g., to help provide mechanical support for parasitic element 132H). Similar structures may be used to form parasitic element 132V on sidewall 102C of FIG. 10.

Parasitic element 132H may be aligned with and overlapping (e.g., completely overlapping) the lateral area of feed probe 85H in the Y-Z plane. Similarly, parasitic element 132V may be aligned with and overlapping (e.g., completely overlapping) the lateral area of feed probe 85V in the X-Z plane (FIG. 10). Parasitic elements 132H and 132V may serve to mitigate cross-polarization interference for relatively low frequencies such as frequencies from about 24 GHz to about 30 GHz. However, if care is not taken, cross-polarization interference may still occur at higher frequencies such as frequencies from about 37 GHz to about 43 GHz. In order to mitigate cross-polarization at higher frequencies, antenna 40 may include additional parasitic patches on other portions of dielectric resonating element 92.

As shown in FIG. 11, dielectric resonating element 92 may have a top end (portion) 136 at top surface 98 (e.g., the end of dielectric resonating element 92 opposing feed probe 85H and flexible printed circuit 72). Antenna 40 may include one or more parasitic elements 134 patterned onto one or more sidewalls of dielectric resonating element 92 at end 136. For example, antenna 40 may include a first parasitic element 134D patterned onto sidewall 102D at end 136 and/or a second parasitic element 134B patterned onto sidewall 102B. Parasitic elements 134D and 134B may be floating conductive patches that are not coupled to signal traces or ground traces for antenna 40. Parasitic element 134D may be aligned with and overlapping (e.g., completely overlapping) parasitic element 134B. Parasitic element 134D may have the same shape and size as parasitic element 134B, if desired. Parasitic elements 134D and 134B may serve to create additional electromagnetic boundary conditions for dielectric resonating element 92. These boundary conditions may serve to align the electric field excited by feed probe 85H at relatively high frequencies, such as frequencies from about 37 GHz to about 43 GHz, in a single direction between sidewalls 102D and 102B (e.g., in a horizontal direction parallel to the X-axis). This may serve to mitigate cross-polarization interference for feed probe 85H at these relatively high frequencies.

Figure 12:
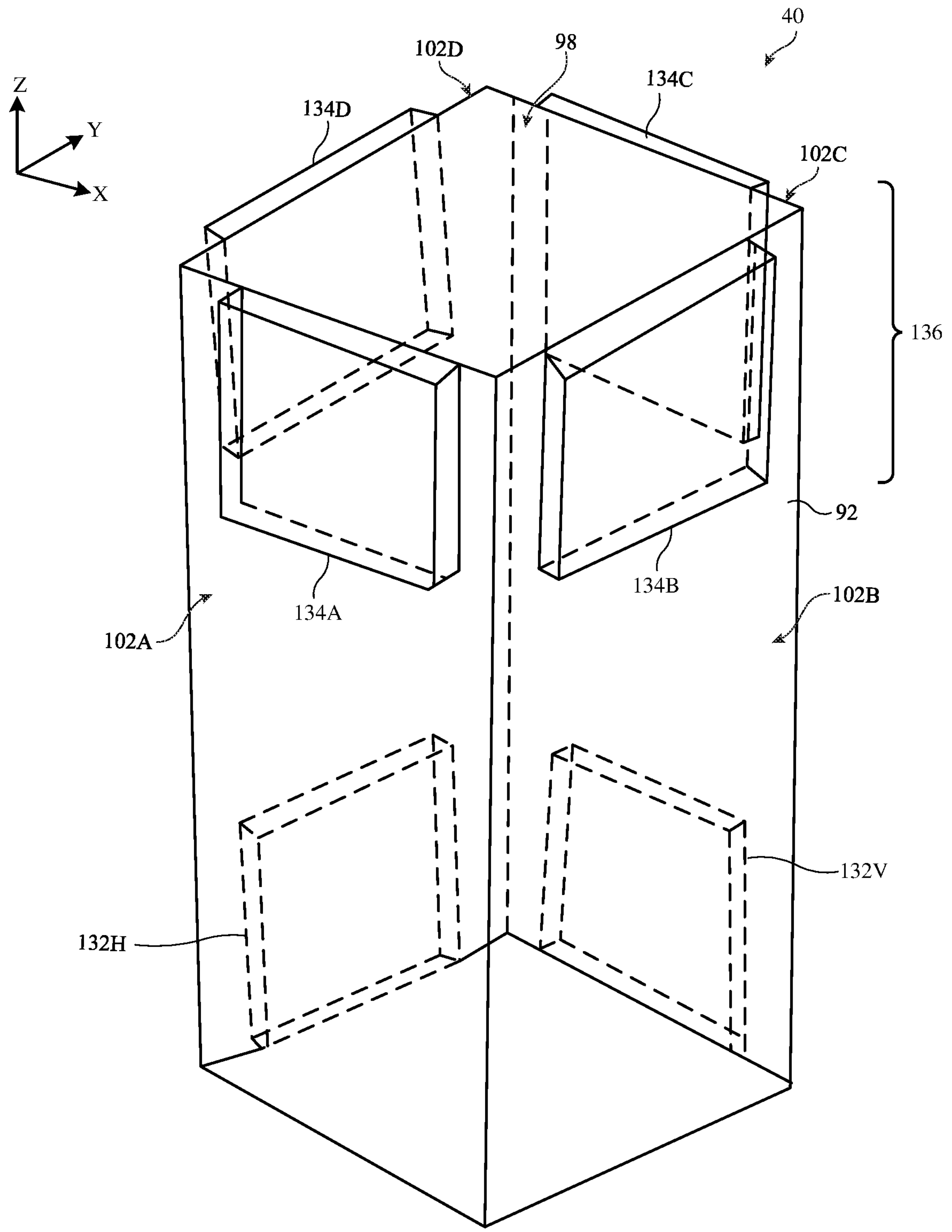
FIG. 12 is a perspective view of an illustrative probe-fed dielectric resonator antenna having floating parasitic patches at an end of the antenna opposite to feed probes for the antenna in accordance with some embodiments.

The example of FIG. 11 is merely illustrative. In another suitable arrangement, parasitic elements 134D and 134B may be patterned onto portions of sidewalls 102D and 102B that are interposed between end 136 and feed probe 85H (e.g., parasitic elements 134D and 134B need not be formed at end 136 of dielectric resonating element 92). When similar parasitic elements 134 are patterned onto dielectric resonating element 92 for mitigating cross-polarization interference on feed probe 85V of FIG. 10, antenna 40 may include a total of six parasitic elements. FIG. 12 is a perspective view showing how antenna 40 may include six parasitic elements.

In the example of FIG. 12, feed probes 85H and 85V have been omitted for the sake of clarity. Dielectric resonating element 92 of FIG. 12 is shown in transparency for the sake of illustration. As shown in FIG. 12, antenna 40 may include parasitic element 132H on sidewall 102D at the end of dielectric resonating element 92 opposite top surface 98. Antenna 40 may include parasitic element 132V on sidewall 102C at the end of dielectric resonating element 92 opposite top surface 98. Antenna 40 may also include a parasitic element 134A patterned onto sidewall 102A at end 136 of dielectric resonating element 92 and may include a parasitic element 134C patterned onto sidewall 102C at end 136 of dielectric resonating element 92.

Parasitic elements 134A and 134C may be floating conductive patches that are not coupled to signal traces or ground traces for antenna 40. Parasitic element 134C may be aligned with and overlapping (e.g., completely overlapping) parasitic element 134A. Parasitic element 134C may have the same shape and size as parasitic element 134A, if desired. Parasitic elements 134C and 134A may serve to create additional electromagnetic boundary conditions for dielectric resonating element 92. These boundary conditions may serve to align the electric field excited by feed probe 85V (FIG. 10) at relatively high frequencies such as frequencies from about 37 GHz to about 43 GHz in a single direction between sidewalls 102A and 102C (e.g., in a vertical direction parallel to the Y-axis). This may serve to mitigate cross-polarization interference for feed probe 85V (FIG. 10) at these relatively high frequencies.

The example of FIG. 12 is merely illustrative. If desired, additional parasitic elements may be patterned onto any desired portions of sidewalls 102 (e.g., antenna 40 may include more than six parasitic elements). Parasitic elements 132H, 132V, 134A, 134B, 134C, and/or 134D may be omitted if desired. The parasitic elements may collectively serve to isolate antenna 40 from cross-polarization interference at any desired frequencies.

Figure 13:
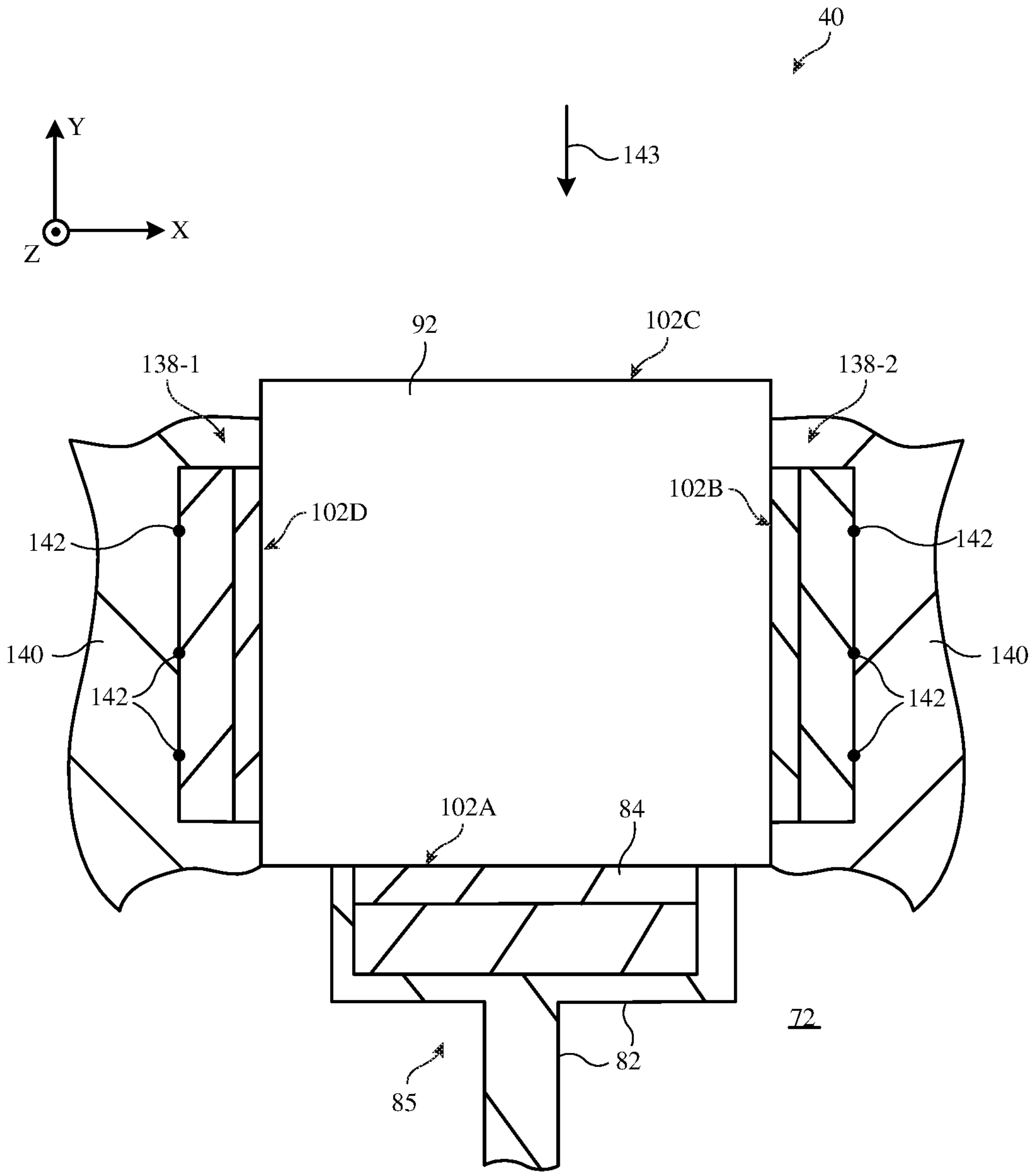
FIG. 13 is a top-down view of an illustrative probe-fed dielectric resonating antenna having a single feed probe and grounded parasitic patches for mitigating cross-polarization interference in accordance with some embodiments.

Antenna 40 may also include cross-polarization interference mitigating parasitic elements in scenarios where antenna 40 is fed using only a single feed probe. FIG. 13 is a top-down view showing how antenna 40 may include cross-polarization interference mitigating parasitic elements in an arrangement where antenna 40 is fed using only a single feed probe 85.

As shown in FIG. 13, antenna 40 may be fed using a single feed probe 85. Conductive traces 84 of feed probe 85 may be patterned onto sidewall 102A of dielectric resonating element 92. Conductive traces 84 may be coupled to signal traces 82 on the underlying flexible printed circuit 72. Ground traces such as ground traces 140 may also be patterned onto flexible printed circuit 72.

Antenna 40 may include one or more parasitic elements 138 such as a first parasitic element 138-1 and a second parasitic element 138-2. Parasitic element 138-1 may be formed from a patch of conductive traces (e.g., a conductive patch) that is patterned onto sidewall 102D of dielectric resonating element 92. Parasitic element 138-2 may be formed from a patch of conductive traces (e.g., a conductive patch) that is patterned onto sidewall 102B of dielectric resonating element 92. Parasitic elements 138-1 and 138-2 may each have the same size and lateral dimensions (e.g., in the Y-Z plane) as conductive traces 84 (e.g., in the X-Z plane), for example. Parasitic element 138-1 and parasitic element 138-2 may each be coupled to ground traces 140 at flexible printed circuit 72 by conductive interconnect structures 142. Conductive interconnect structures 142 may include solder, welds, conductive adhesive, conductive tape, conductive foam, conductive springs, conductive brackets, and/or any other desired conductive interconnect structures. In this way, parasitic elements 138-1 and 138-2 may each be held at a ground potential (e.g., parasitic elements 138-1 and 138-2 may be grounded patches). Parasitic element 138-1 may be omitted or parasitic element 138-2 may be omitted if desired (e.g., antenna 40 may include only a single parasitic element 138 if desired).

Parasitic element 138-1 and/or parasitic element 138-2 may serve to alter the electromagnetic boundary conditions of dielectric resonating element 92 to mitigate cross-polarization interference for feed probe 85 (e.g., to isolate feed probe 85 from interference from horizontally-polarized signals in scenarios where feed probe 85 handles vertically-polarized signals). Sidewall 102C of dielectric resonating element 92 may be free from conductive material such as parasitic elements 138.

Figure 14:
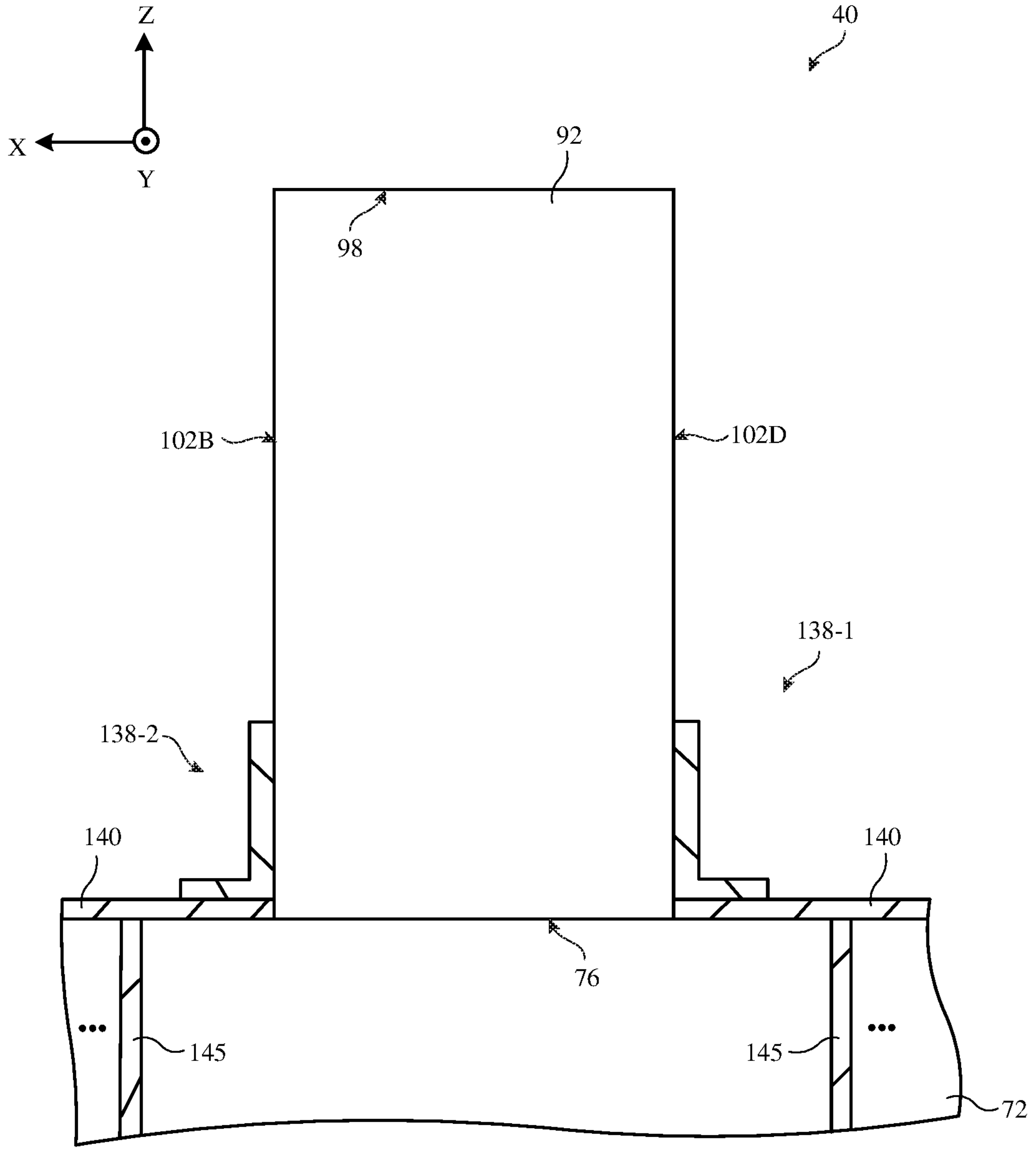
FIG. 14 is a side view of an illustrative probe-fed dielectric resonating antenna having a single feed probe and grounded parasitic patches for mitigating cross-polarization interference in accordance with some embodiments.

FIG. 14 is a side view of antenna 40 of FIG. 13 (e.g., as taken in the direction of arrow 143 of FIG. 13). As shown in FIG. 14, ground traces 140 may be patterned onto top surface 76 of flexible printed circuit 72. Ground traces 140 may be coupled to other grounded structures in device 10. For example, ground traces 140 may be coupled to ground traces 80 of FIGS. 6-8 using conductive vias 145 that extend through flexible printed circuit 72. Ground traces 140 may have lateral openings to accommodate signal traces 82 of FIG. 13 if desired. Parasitic element 138-1 may be formed from a patch of conductive traces patterned onto sidewall 102D whereas parasitic element 138-2 is formed from a patch of conductive traces patterned onto sidewall 102B. Parasitic elements 138-1 and 138-2 may be coupled to the underlying ground traces 140. Parasitic elements 138-1 and 138-2 are located at the end of dielectric resonating element 92 opposite to top surface 98 (e.g., the end of dielectric resonating element 92 at flexible printed circuit 72). If desired, the single-polarization antenna 40 of FIGS. 13 and 14 may include additional parasitic elements (e.g., at the end of dielectric resonating element 92 at top surface 98) such as parasitic elements 134A-134D of FIG. 12.

Figure 15:
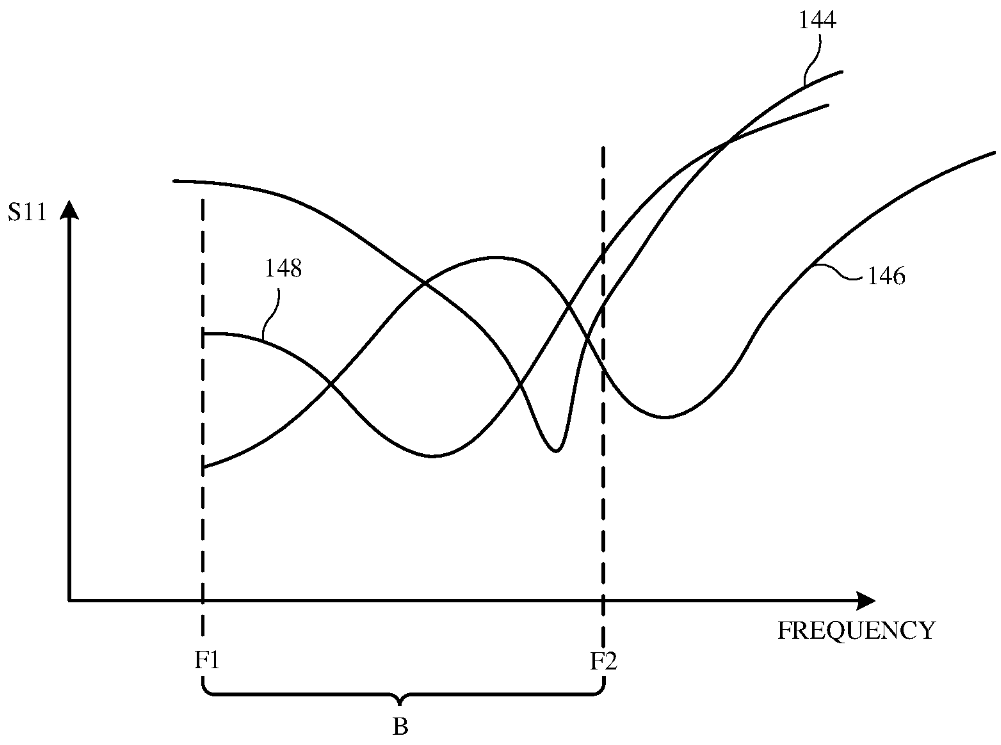
FIG. 15 is a plot of antenna performance (return loss) as a function of frequency for illustrative probe-fed dielectric resonating antennas having different numbers of grounded parasitic patches in accordance with some embodiments.

FIG. 15 is a plot of antenna performance (return loss) as a function of frequency for the single-polarization antenna 40 of FIGS. 13 and 14. Curve 144 of FIG. 15 plots the response of antenna 40 in the absence of parasitic elements 138-1 and 138-2. As shown by curve 144, antenna 40 exhibits a relatively narrow response peak within the frequency band of operation of dielectric resonating element 92 (e.g., a frequency band B extending from frequency F1 to frequency F2). Frequency F1 may be about 26 GHz whereas frequency F2 is about 30 GHz, as just one example. The narrow response peak of curve 144 may be insufficient to satisfactorily cover an entirety of frequency band B from frequency F1 to frequency F2.

Curve 146 of FIG. 15 plots the response of an antenna 40 in an example where antenna 40 includes only one of parasitic elements 138-1 and 138-2. As shown by curve 146, the presence of a single parasitic element 138 may serve to improve the response of antenna 40 at the lower end of frequency band B (e.g., at frequencies near frequency F1) and at the upper end of frequency band B (e.g., at frequencies near frequency F2) relative to scenarios where no parasitic elements are used.

Curve 148 of FIG. 15 plots the response of antenna 40 in an example where antenna 40 includes both parasitic elements 138-1 and 138-2. As shown by curve 148, the presence of both parasitic elements 138-1 and 138-2 may serve to improve the response of antenna 40 across most of frequency band B relative to scenarios where no parasitic elements are used. In addition, the presence of both parasitic elements 138-1 and 138-2 may serve to improve the response of antenna 40 near the center of frequency band B relative to scenarios where only one parasitic element 138 is used. The example of FIG. 15 is merely illustrative. Curves 144, 146, and 148 may have other shapes. Frequency band B may include any desired millimeter and/or centimeter wave frequencies.

Figure 16:
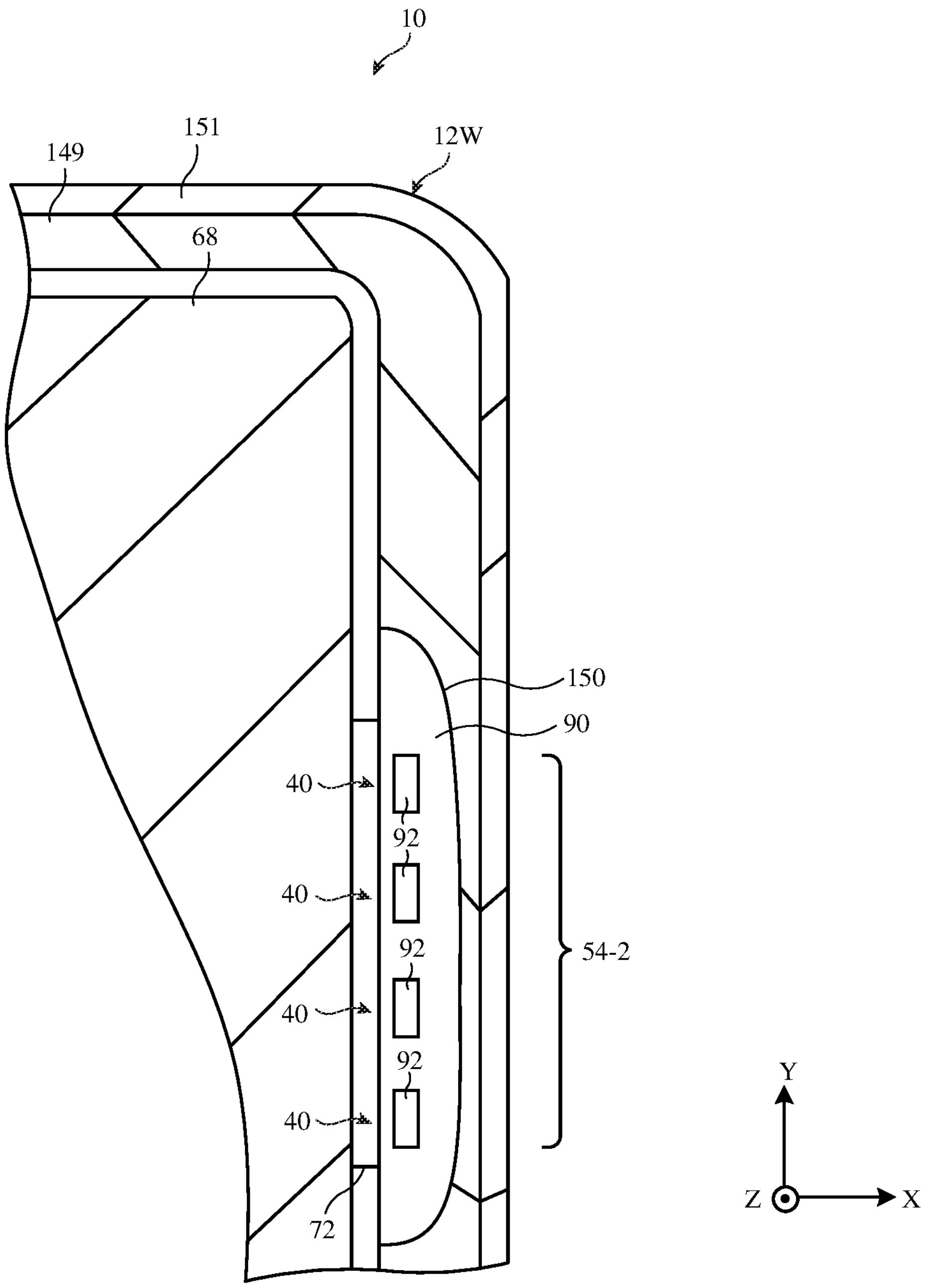
FIG. 16 is a top-down view of an illustrative electronic device having probe-fed dielectric resonator antennas aligned with a notch in peripheral conductive housing structures in accordance with some embodiments.

One or more front-facing phased antenna arrays 54-2 (e.g., phased antenna arrays including the dual-polarization antenna 40 of FIGS. 10-12 and/or the single-polarization antenna 40 of FIGS. 13 and 14) may be mounted at any desired locations in device 10 along the periphery of display 14 for radiating through the display (e.g., within inactive area IA of display 14 of FIG. 1). FIG. 16 is a top-down view of device 10 showing how a given phased antenna array 54-2 may be aligned with a notch in peripheral conductive housing structures 12W.

As shown in FIG. 16, peripheral conductive housing structures 12W may run around the periphery of display module 68 in device 10. Display cover layer 56 of FIGS. 5 and 6 has been omitted from FIG. 16 for the sake of clarity. Peripheral conductive housing structures 12W may include an inwardly protruding lip 149 (sometimes referred to herein as a ledge or datum) and a raised portion 151. Raised portion 151 may run around the peripheral edge of the display cover layer. Lip 149 of peripheral conductive housing structures 12W may include an opening such as notch 150. Phased antenna array 54-2 (e.g., a phased antenna array that covers a single polarization and frequency band, a phased antenna array that covers multiple polarizations in the same frequency band(s), a phased antenna array that covers multiple polarizations and multiple frequency bands, or a phased antenna array that covers a single polarization and multiple frequency bands) may be mounted below lip 149 and aligned with notch 150.

The antennas 40 in phased antenna array 54-2 may each include a dielectric resonating element 92 surrounded by one or more dielectric substrates 90. Each antenna 40 in phased antenna array 54-2 may be fed using a corresponding radio-frequency transmission line in the same flexible printed circuit 72. This example is merely illustrative and, if desired, two or more antennas 40 in phased antenna array 54-2 may be fed using radio-frequency transmission lines in separate flexible printed circuits. The antennas 40 in phased antenna array 54-2 may convey radio-frequency signals through notch 150 and the display cover layer (not shown). Phased antenna array 54-2 may perform beam steering within the hemisphere above the front face of device 10. The example of FIG. 16 is merely illustrative. If desired, the antennas 40 in phased antenna array 54-2 may be arranged in a two-dimensional pattern having multiple rows and columns of antennas or in may be arranged in other patterns.

Figure 17:
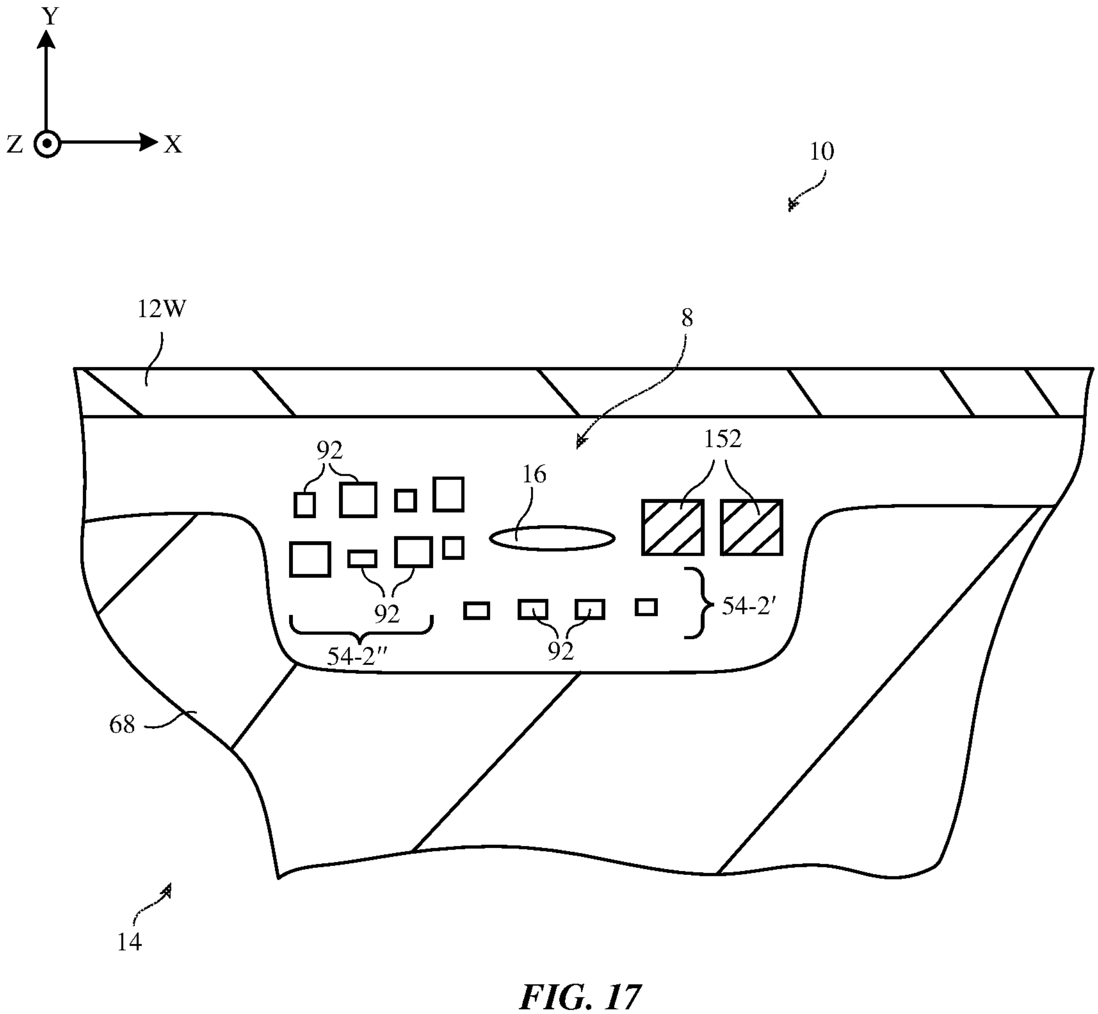
FIG. 17 is a top-down view of an illustrative electronic device having probe-fed dielectric resonator antennas aligned with a notch in a display module in accordance with some embodiments.

If desired, phased antenna array 54-2 may be located elsewhere within device 10. In one suitable arrangement, phased antenna array 54-2 may be located within notch 8 in active area AA of display 14 (FIG. 1). FIG. 17 is a top-down view showing how phased antenna array 54-2 may be aligned with notch 8 in active area AA of display 14.

As shown in FIG. 17, display module 68 of display 14 may include notch 8. Display cover layer 56 of FIGS. 5 and 6 has been omitted from FIG. 17 for the sake of clarity. Display module 68 may form active area AA of display 14 whereas notch 8 forms part of inactive area IA of display 14 (FIG. 1). The edges of notch 8 may be defined by peripheral conductive housing structures 12W and display module 68. For example, notch 8 may have two or more edges (e.g., three edges) defined by display module 68 and one or more edges defined by peripheral conductive housing structures 12W.

Device 10 may include speaker port 16 (e.g., an ear speaker) within notch 8. If desired, device 10 may include other components 152 within notch 10. Other components 152 may include one or more image sensors such as one or more cameras, an infrared image sensor, an infrared light emitter (e.g., an infrared dot projector and/or flood illuminator), an ambient light sensor, a fingerprint sensor, a capacitive proximity sensor, a thermal sensor, a moisture sensor, or any other desired input/output components (e.g., input/output devices 26 of FIG. 2). One or more phased antenna arrays 54-2 may be aligned with the portion(s) of notch 8 that are not occupied by other components 152 or speaker port 16. Phased antenna arrays 54-2 that are aligned with notch 8 may include one-dimensional phased antenna arrays such as one-dimensional phased antenna array 54-2' and/or two-dimensional phased antenna arrays such as two-dimensional phased antenna array 54-2". Because dielectric resonating elements 92 occupy less lateral area than patch antennas or slot antennas that cover the same frequencies, phased antenna arrays 54-2' and 54-2" may fit within notch 8 and may still exhibit satisfactory antenna efficiency despite the presence of speaker port 16 and other components 152.

If desired, multiple phased antenna arrays 54-2 may be aligned with multiple notches in peripheral conductive housing structures 12W (e.g., multiple notches 150 of FIG. 16) and/or may be aligned with notch 8 in display module 68. Phased antenna arrays 54-2 may provide beam steering in one or more frequency bands between 10 GHz and 300 GHz within some or all of the hemisphere over the front face of device 10. When combined with the operation of phased antenna array 54-1 at the rear of device 10 (FIG. 5), the phased antenna arrays in device 10 may collectively provide coverage within approximately a full sphere around device 10. The presence of parasitic elements in the antennas of phased antenna arrays 54-2 may serve to mitigate cross-polarization interference in the phased antenna arrays, thereby optimizing radio-frequency performance of the phased antenna arrays.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

a housing;

a display having a display cover layer mounted to the housing; and a probe-fed dielectric resonator antenna in the housing and configured to convey radio-frequency signals in a frequency band greater than 10 GHz through the display cover layer, wherein the probe-fed dielectric resonator antenna comprises:

a parasitic element configured to isolate the probe-fed dielectric resonator antenna from cross-polarization interference.

2. The electronic device of claim 1, wherein the probe-fed dielectric resonator antenna further comprises:

a feed probe on a dielectric resonating element, wherein the feed probe is configured to excite the dielectric resonating element to resonate in the frequency band.

3. The electronic device of claim 2, wherein the dielectric resonating element comprises a first sidewall, a second sidewall, a third sidewall opposite the first sidewall, and a fourth sidewall opposite the second sidewall, the feed probe being coupled to the first sidewall.

4. The electronic device of claim 3, wherein the parasitic element is coupled to the third sidewall and is aligned with the feed probe.

5. The electronic device of claim 4, further comprising:

a substrate, wherein the dielectric resonating element is mounted to the substrate; and a radio-frequency transmission line on the substrate and coupled to the feed probe, wherein the dielectric resonating element has a first end at the display and an opposing second end at the substrate, the probe-fed dielectric resonator antenna further comprising:

an additional parasitic element coupled to the dielectric resonating element at the first end of the dielectric resonating element.

6. The electronic device of claim 4, wherein the probe-fed dielectric resonator antenna further comprises:

an additional feed probe coupled to the second sidewall of the dielectric resonating element, wherein the additional feed probe is configured to excite the dielectric resonating element; and an additional parasitic element configured to isolate the probe-fed dielectric resonator antenna from cross-polarization interference, wherein the additional parasitic element is coupled to the fourth sidewall and is aligned with the additional feed probe.

7. The electronic device of claim 6, wherein the dielectric resonating element has a first end at the feed probe and has an opposing second end, the probe-fed dielectric resonator antenna further comprising:

a first floating conductive patch coupled to the first sidewall at the second end;

a second floating conductive patch coupled to the second sidewall at the second end;

a third floating conductive patch coupled to the third sidewall at the second end, wherein the third floating conductive patch is aligned with the first floating conductive patch; and a fourth floating conductive patch coupled to the fourth sidewall at the second end, wherein the fourth floating conductive patch is aligned with the second floating conductive patch.

8. The electronic device of claim 3, wherein the parasitic element is coupled to the second sidewall.

9. The electronic device of claim 8, wherein the probe-fed dielectric resonator antenna further comprises:

an additional parasitic element configured to isolate the probe-fed dielectric resonator antenna from cross-polarization interference, wherein the additional parasitic element is coupled to the fourth sidewall.

10. The electronic device of claim 9, wherein the third sidewall is free of conductive material.

11. The electronic device of claim 9, further comprising:

a substrate, wherein the dielectric resonating element is mounted to a surface of the substrate;

a radio-frequency transmission line on the substrate and coupled to the feed probe; and ground traces on the surface of the substrate, wherein the parasitic element and the additional parasitic element are coupled to the ground traces.

12. The electronic device of claim 1, wherein the housing comprises peripheral conductive housing structures that extend around a periphery of the electronic device, the display cover layer is mounted to the peripheral conductive housing structures, and the electronic device further comprises:

a notch in the peripheral conductive housing structures, wherein the probe-fed dielectric resonating antenna is aligned with the notch and is configured to convey the radio-frequency signals through the notch.

13. The electronic device defined in claim 1, wherein the housing comprises peripheral conductive housing structures that extend around a periphery of the electronic device, the display cover layer is mounted to the peripheral conductive housing structures, the display comprises a display module configured to emit light through the display cover layer, the display module comprises a notch, the notch has edges defined by the display module and the peripheral conductive housing structures, and the electronic device further comprises:

an audio speaker aligned with the notch; and an image sensor aligned with the notch, wherein the probe-fed dielectric resonator antenna is aligned with the notch and is configured to convey the radio-frequency signals through the notch.

14. An antenna comprising:

a dielectric resonating element having a bottom surface, a top surface, and first, second, third, and fourth sidewalls extending from the bottom surface to the top surface, wherein the first sidewall opposes the third sidewall and the second sidewall opposes the fourth sidewall;

a feed probe coupled to the first sidewall, wherein the feed probe is configured to excite the dielectric resonating element to resonate in a frequency band greater than 10 GHz; and a floating parasitic patch coupled to the third sidewall and overlapping the feed probe.

15. The antenna of claim 14, further comprising:

an additional feed probe coupled to the second sidewall, wherein the additional feed probe is configured to excite the dielectric resonating element to resonate in the frequency band; and an additional floating parasitic patch coupled to the fourth sidewall and overlapping the additional feed probe.

16. The antenna of claim 15, wherein the dielectric resonating element has a first end at the bottom surface and a second end at the top surface, the feed probe, the additional feed probe, the floating parasitic patch, and the additional floating parasitic patch being located at the first end of the dielectric resonating element.

17. The antenna of claim 16, further comprising:

at least one floating parasitic patch coupled to the dielectric resonating element at the second end of the dielectric resonating element.

18. An antenna comprising:

a dielectric resonating element having a bottom surface, a top surface, and first, second, third, and fourth sidewalls extending from the bottom surface to the top surface, wherein the first sidewall opposes the third sidewall and the second sidewall opposes the fourth sidewall;

a feed probe coupled to the first sidewall, wherein the feed probe is configured to excite the dielectric resonating element to resonate in a frequency band greater than 10 GHz;

a grounded parasitic patch coupled to the second sidewall; and an additional parasitic patch coupled to the dielectric resonating element.

19. The antenna of claim 18, wherein the additional parasitic patch is grounded, is coupled to the fourth sidewall, and overlaps the grounded parasitic patch.

20. The antenna of claim 19, wherein the dielectric resonating element has a first end at the bottom surface and a second end at the top surface, the feed probe, the grounded parasitic patch, and the additional grounded parasitic patch being located at the first end of the dielectric resonating element.

* * * * *